(12) United States Patent
Wang et al.

(10) Patent No.: US 10,991,045 B2
(45) Date of Patent: Apr. 27, 2021

(54) BLOCKCHAIN-BASED SETTLEMENT METHOD, APPARATUS, AND ELECTRONIC DEVICE

(71) Applicant: Advanced New Technologies Co., Ltd., Grand Cayman (KY)

(72) Inventors: Xu Wang, Hangzhou (CN); Zhaolin Feng, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/803,720

(22) Filed: Feb. 27, 2020

(65) Prior Publication Data

US 2020/0202437 A1 Jun. 25, 2020

Related U.S. Application Data

(63) Continuation of application No. PCT/CN2020/070848, filed on Jan. 8, 2020.

(30) Foreign Application Priority Data

Apr. 29, 2019 (CN) .......................... 201910356863.5

(51) Int. Cl.
*G06Q 40/04* (2012.01)
*G06Q 40/00* (2012.01)
(Continued)

(52) U.S. Cl.
CPC ............. *G06Q 40/04* (2013.01); *G06Q 40/12* (2013.12); *H04L 9/0643* (2013.01);
(Continued)

(58) Field of Classification Search
None
See application file for complete search history.

(56) References Cited

U.S. PATENT DOCUMENTS 7,536,354 B1 * 5/2009 deGroeve .............. G06Q 20/10
705/34
10,423,993 B2 9/2019 Metnick
(Continued)

FOREIGN PATENT DOCUMENTS

CN          107918868        4/2018
CN          108764868        11/2018
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Christopher Bridges
(74) *Attorney, Agent, or Firm* — Fish & Richardson P.C.

(57) ABSTRACT

Computer-implemented methods, non-transitory, computer-readable media, and computer-implemented systems for blockchain-based payment settlement are provided. A payment settlement request transaction of a payee system whose certificate has been stored on a blockchain is monitored. A target payment transaction is obtained that corresponds to the last node of a payment transaction linked list comprising payment transactions whose certificates have been stored on the blockchain in a payment order. A target payment write-off transaction is obtained that corresponds to the last node of a payment write-off transaction linked list comprising payment write-off transactions whose certificates have been stored on the blockchain in a payment write-off order. If an accumulated value in the target payment transaction is identical to an accumulated value in the target payment write-off transaction, fund settlement is performed based on the accumulated value in the target payment transaction or the target payment write-off transaction.

20 Claims, 7 Drawing Sheets

(51) Int. Cl.
*H04L 9/32* (2006.01)
*H04L 9/06* (2006.01)

(52) U.S. Cl.
CPC ........ *H04L 9/3263* (2013.01); *H04L 2209/38* (2013.01); *H04L 2209/56* (2013.01)

(56) References Cited

U.S. PATENT DOCUMENTS

| | | | |
|---|---|---|---|
| 10,592,993 B2 * | 3/2020 | Pandian | G06Q 40/12 |
| 10,664,294 B2 * | 5/2020 | Pai | G06F 9/44505 |
| 2015/0348017 A1 | 12/2015 | Allmen | |
| 2016/0042468 A1 * | 2/2016 | Shaaban | G06Q 40/12 705/30 |
| 2017/0270527 A1 | 9/2017 | Rampton | |
| 2018/0101914 A1 * | 4/2018 | Samuel | G06Q 20/102 |
| 2018/0137512 A1 * | 5/2018 | Georgiadis | G06Q 50/184 |
| 2018/0144412 A1 * | 5/2018 | Chenard | G06Q 20/10 |
| 2019/0228391 A1 * | 7/2019 | Hu | G06Q 20/065 |
| 2019/0392437 A1 * | 12/2019 | Castagna | G06F 16/23 |

FOREIGN PATENT DOCUMENTS

| | | | |
|---|---|---|---|
| CN | 108960826 | 12/2018 | |
| CN | 109003175 | 12/2018 | |
| CN | 109102384 | 12/2018 | |
| CN | 110163605 | 8/2019 | |
| WO | WO-2017098519 A1 * | 6/2017 | G06F 21/62 |
| WO | WO-2018026883 A1 * | 2/2018 | G06F 16/2379 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/CN2020/070848, dated Apr. 1, 2020, 21 pages (with machine translation).

* cited by examiner

BLOCKCHAIN-BASED SETTLEMENT METHOD, APPARATUS, AND ELECTRONIC DEVICE

CROSS-REFERENCE TO RELATED APPLICATIONS

This application is a continuation of PCT Application No. PCT/CN2020/070848, filed on Jan. 8, 2020, which claims priority to Chinese Patent Application No. 201910356863.5, filed on Apr. 29, 2019, and each application is hereby incorporated by reference in its entirety.

TECHNICAL FIELD

One or more implementations of the present specification relate to the field of blockchain technologies, and in particular, to blockchain-based settlement methods, apparatuses, and electronic devices.

BACKGROUND

The blockchain technology, also referred to as a distributed ledger technology, is an emerging technology in which several computing devices jointly participate in "accounting" and jointly maintain a complete distributed database. Due to its features of decentralization, openness and transparency, participation in database recording by each computing device, and fast data synchronization between computing devices, the blockchain technology has been widely used in many fields.

SUMMARY

In view of the previous description, the present specification provides blockchain-based settlement methods, apparatuses, and electronic devices.

The present specification is implemented by using the following technical solutions:

According to a first aspect of the present specification, a blockchain-based settlement method is provided, where the method is applied to a payment system connected to the blockchain, and includes the following: monitoring a settlement request transaction of a payee system whose certificate has been stored on the blockchain; in response to the detected payment settlement request transaction, obtaining a target payment transaction corresponding to the last node of a payment transaction linked list comprising payment transactions whose certificates have been stored on the blockchain in a payment order, obtaining a target payment write-off transaction corresponding to the last node of a payment write-off transaction linked list comprising payment write-off transactions whose certificates have been stored on the blockchain in a payment write-off order, where the payment transaction includes an accumulated value corresponding to accumulation of unsettled transactions up to the payment transaction in the payment transaction linked list, and the payment write-off transaction includes an accumulated value corresponding to accumulation of unsettled transactions up to the payment write-off transaction in the payment write-off transaction linked list; determining whether an accumulated value in the target payment transaction is the same as an accumulated value in the target payment write-off transaction; and if yes, performing fund settlement based on the accumulated value in the target payment transaction or the target payment write-off transaction.

Optionally, certificate storage for a payment transaction in the payment transaction linked list is implemented in the following method: obtaining a payment message sent by a user terminal, where the payment message includes payment information; constructing a payment transaction based on the payment information in response to the payment message; and publishing the payment transaction to the blockchain for certificate storage, so that the payee system performs payment write-off based on the payment information in the payment transaction after detecting the payment transaction whose certificate has been stored on the blockchain, and publishes a payment write-off transaction constructed by using a payment write-off result to the blockchain for certificate storage.

Optionally, the publishing the payment transaction to the blockchain for certificate storage includes the following: detecting whether an accumulated value in a payment transaction corresponding to the last node of the current payment transaction linked list is the same as an accumulated value in a payment write-off transaction corresponding to the last node of the current payment write-off linked list; and if yes, publishing the payment transaction to the blockchain for certificate storage.

Optionally, the accumulated value in the payment transaction includes the total amount of accumulated payments and the total number of accumulated payments; and the accumulated value in the payment write-off transaction includes the total amount of accumulated write-offs and the total number of accumulated write-offs.

Optionally, the payment transaction further includes a hash index pointing to a previous payment transaction whose certificate has been stored on the blockchain; and the payment write-off result transaction further includes a hash index pointing to a previous payment write-off transaction whose certificate has been stored on the blockchain, and a hash index pointing to the payment transaction corresponding to the payment write-off transaction.

Optionally, the payment information includes a payment amount; the payment system maintains the total amount of accumulated payments and the total number of accumulated payments in the payment transaction corresponding to the last node of the payment transaction linked list; and the constructing a payment transaction based on the payment information includes the following: obtaining the payment transaction corresponding to the last node of the current payment transaction linked list, and generating a hash index of the payment transaction corresponding to the last node of the linked list; determining the total amount of accumulated payments in the payment transaction based on the total amount of accumulated payments maintained by the payment system and the payment amount included in the payment message; determining the total number of accumulated payments in the payment transaction based on the total number of accumulated payments maintained by the payment system; and constructing the payment transaction based on the payment information, the generated hash index, and the total amount of accumulated payments and the total number of accumulated payments in the payment transaction.

Optionally, after the publishing the payment transaction to the blockchain for certificate storage, the method further includes the following: updating the total amount of accumulated payments and the total number of accumulated payments maintained by the payment system, by using the total amount of accumulated payments and the total number of accumulated payments recorded in the payment transaction, respectively.

Optionally, the method further includes the following: clearing the total amount of accumulated payments and the total number of accumulated payments maintained by the payment system after the fund settlement is completed.

Optionally, the method further includes the following: constructing a payment settlement certificate transaction based on a fund settlement result after the fund settlement is completed; and publishing the payment settlement certificate transaction to the blockchain for certificate storage.

According to a second aspect of the present application, a blockchain-based settlement method is provided, where the method is applied to a payee system connected to the blockchain, and includes the following: in response to a payment settlement request initiated by a client device, constructing a settlement request transaction based on the settlement request; and publishing the payment settlement request transaction to the blockchain for certificate storage, so that a payment system monitors the payment settlement request transaction of the payee system whose certificate has been stored on the blockchain; in response to the detected payment settlement request transaction, obtains a target payment transaction corresponding to the last node of a payment transaction linked list comprising payment transactions whose certificates have been stored on the blockchain in a payment order, obtains a target payment write-off transaction corresponding to the last node of a payment write-off transaction linked list comprising payment write-off transactions whose certificates have been stored on the blockchain in a payment write-off order; determines whether an accumulated value in the target payment transaction is the same as an accumulated value in the target payment write-off transaction; and if yes, performs fund settlement based on the accumulated value in the target payment transaction or the target payment write-off transaction, where the payment transaction includes an accumulated value corresponding to accumulation of unsettled transactions up to the payment transaction in the payment transaction linked list, and the payment write-off transaction includes an accumulated value corresponding to accumulation of unsettled transactions up to the payment write-off transaction in the payment write-off transaction linked list.

Optionally, certificate storage for the payment write-off transaction is implemented in the following method: monitoring the payment transaction of the payment system whose certificate has been stored on the blockchain, where the payment transaction includes payment information; performing payment write-off based on the payment information in the payment transaction in response to the detected payment transaction; and constructing the payment write-off transaction based on a payment write-off result, and publishing the payment write-off transaction to the blockchain for certificate storage.

Optionally, the accumulated value in the payment transaction includes the total amount of accumulated payments and the total number of accumulated payments; and the accumulated value in the payment write-off transaction includes the total amount of accumulated write-offs and the total number of accumulated write-offs.

Optionally, the payment transaction further includes a hash index pointing to a previous payment transaction whose certificate has been stored on the blockchain; and the payment write-off result transaction further includes a hash index pointing to a previous payment write-off transaction whose certificate has been stored on the blockchain, and a hash index pointing to the payment transaction corresponding to the payment write-off transaction.

Optionally, the payment information includes a payment amount; the payee system maintains the total amount of accumulated write-offs and the total number of accumulated write-offs in the payment write-off transaction corresponding to the last node of the payment write-off transaction linked list; and the constructing the payment write-off transaction based on a payment write-off result includes the following: obtaining the payment write-off transaction corresponding to the last node of the current payment write-off transaction linked list, and generating a hash index of the payment write-off transaction corresponding to the last node of the linked list; generating a hash index of the detected payment transaction; determining the total amount of accumulated write-offs in the payment write-off transaction based on the total amount of accumulated write-offs maintained by the payee system and the payment amount included in the payment transaction; determining the total number of accumulated write-offs in the payment write-off transaction based on the total number of accumulated write-offs maintained by the payee system; and constructing the payment write-off transaction based on the payment write-off result, the hash index of the payment write-off transaction corresponding to the last node of the linked list, the hash index of the payment transaction, the total amount of accumulated write-offs, and the total number of accumulated write-offs in the payment write-off transaction.

Optionally, the publishing the payment write-off transaction to the blockchain for certificate storage includes the following: detecting whether the sum of the total amount of accumulated write-offs maintained by the payee system and the payment amount is the same as the total amount of accumulated payments in the payment transaction, and detecting whether the number of accumulated write-offs maintained by the payee system plus one is the same as the total number of accumulated payments in the payment transaction; and if both are yes, publishing the payment write-off transaction to the blockchain for certificate storage.

Optionally, after the publishing the payment write-off transaction to the blockchain for certificate storage, the method further includes the following: updating the total amount of accumulated write-offs and the total number of accumulated write-offs maintained by the payee system based on the total amount of accumulated write-offs and the total number of accumulated write-offs in the payment write-off transaction.

Optionally, the method further includes the following: monitoring a payment settlement certificate transaction that is published to the blockchain by the payment system; and clearing the total amount of accumulated write-offs and the total number of accumulated write-offs maintained by the payee system in response to the payment settlement certificate transaction.

According to a third aspect of the present application, a blockchain-based settlement apparatus is provided, where the apparatus is applied to a payment system connected to the blockchain, and includes the following: a monitoring unit, configured to monitor a settlement request transaction of a payee system whose certificate has been stored on the blockchain; a first acquisition unit, configured to: in response to the detected payment settlement request transaction, obtain a target payment transaction corresponding to the last node of a payment transaction linked list comprising payment transactions whose certificates have been stored on the blockchain in a payment order; obtain a target payment write-off transaction corresponding to the last node of a payment write-off transaction linked list comprising payment write-off transactions whose certificates have been stored on the blockchain in a payment write-off order, where the payment transaction includes an accumulated value corresponding to accumulation of unsettled transactions up to the payment transaction in the payment transaction linked list, and the payment write-off transaction includes an accumulated value corresponding to accumulation of unsettled transactions up to the payment write-off transaction in the payment write-off transaction linked list; a determining unit, configured to determine whether an accumulated value in the target payment transaction is the same as an accumulated value in the target payment write-off transaction; and a settlement unit, configured to: if yes, perform fund settlement based on the accumulated value in the target payment transaction or the target payment write-off transaction.

Optionally, the apparatus further includes the following: a second acquisition unit, configured to obtain a payment message sent by a user terminal, where the payment message includes payment information; a first construction unit, configured to construct a payment transaction based on the payment information in response to the payment message; and a first publishing unit, configured to publish the payment transaction to the blockchain for certificate storage, so that the payee system performs payment write-off based on the payment information in the payment transaction after detecting the payment transaction whose certificate has been stored on the blockchain, and publishes a payment write-off transaction constructed by using a payment write-off result to the blockchain for certificate storage.

Optionally, the first publishing unit is configured to: when publishing the payment transaction to the blockchain for certificate storage, detect whether an accumulated value in a payment transaction corresponding to the last node of the current payment transaction linked list is the same as an accumulated value in a payment write-off transaction corresponding to the last node of the current payment write-off linked list; and if yes, publish the payment transaction to the blockchain for certificate storage.

Optionally, the accumulated value in the payment transaction includes the total amount of accumulated payments and the total number of accumulated payments; and the accumulated value in the payment write-off transaction includes the total amount of accumulated write-offs and the total number of accumulated write-offs.

Optionally, the payment transaction further includes a hash index pointing to a previous payment transaction whose certificate has been stored on the blockchain; and the payment write-off result transaction further includes a hash index pointing to a previous payment write-off transaction whose certificate has been stored on the blockchain, and a hash index pointing to the payment transaction corresponding to the payment write-off transaction.

Optionally, the payment information includes a payment amount; the payment system maintains the total amount of accumulated payments and the total number of accumulated payments in the payment transaction corresponding to the last node of the payment transaction linked list; and the first construction unit is configured to: obtain the payment transaction corresponding to the last node of the current payment transaction linked list, and generate a hash index of the payment transaction corresponding to the last node of the linked list; determine the total amount of accumulated payments in the payment transaction based on the total amount of accumulated payments maintained by the payment system and the payment amount included in the payment message; determine the total number of accumulated payments in the payment transaction based on the total number of accumulated payments maintained by the payment system; and construct the payment transaction based on the payment information, the generated hash index, and the total amount of accumulated payments and the total number of accumulated payments in the payment transaction.

Optionally, the apparatus further includes the following: an update unit, configured to: after the payment transaction is published to the blockchain for certificate storage, update the total amount of accumulated payments and the total number of accumulated payments maintained by the payment system, by using the total amount of accumulated payments and the total number of accumulated payments recorded in the payment transaction, respectively.

Optionally, the apparatus further includes the following: a resetting unit, configured to clear the total amount of accumulated payments and the total number of accumulated payments maintained by the payment system after the fund settlement is completed.

Optionally, the apparatus further includes the following: a second construction unit, configured to construct a payment settlement certificate transaction based on a fund settlement result after the fund settlement is completed; and a second publishing unit, configured to publish the payment settlement certificate transaction to the blockchain for certificate storage.

According to a fourth aspect of the present application, a blockchain-based settlement apparatus is provided, where the apparatus is applied to a payee system connected to the blockchain, and includes the following: a first construction unit, configured to: in response to a payment settlement request initiated by a client device, construct a settlement request transaction based on the settlement request; and a first publishing unit, configured to publish the payment settlement request transaction to the blockchain for certificate storage, so that a payment system monitors the payment settlement request transaction of the payee system whose certificate has been stored on the blockchain; in response to the detected payment settlement request transaction, obtains a target payment transaction corresponding to the last node of a payment transaction linked list comprising payment transactions whose certificates have been stored on the blockchain in a payment order, obtains a target payment write-off transaction corresponding to the last node of a payment write-off transaction linked list comprising payment write-off transactions whose certificates have been stored on the blockchain in a payment write-off order; determines whether an accumulated value in the target payment transaction is the same as an accumulated value in the target payment write-off transaction; and if yes, performs fund settlement based on the accumulated value in the target payment transaction or the target payment write-off transaction, where the payment transaction includes an accumulated value corresponding to accumulation of unsettled transactions up to the payment transaction in the payment transaction linked list, and the payment write-off transaction includes an accumulated value corresponding to accumulation of unsettled transactions up to the payment write-off transaction in the payment write-off transaction linked list.

Optionally, the apparatus further includes the following: a first monitoring unit, configured to monitor the payment transaction of the payment system whose certificate has been stored on the blockchain, where the payment transaction includes payment information; a write-off unit, configured to perform payment write-off based on the payment information in the payment transaction in response to the detected payment transaction; a second construction unit, configured to construct the payment write-off transaction based on a payment write-off result; and a second publishing unit, configured to publish the payment write-off transaction to the blockchain for certificate storage.

Optionally, the accumulated value in the payment transaction includes the total amount of accumulated payments and the total number of accumulated payments; and the accumulated value in the payment write-off transaction includes the total amount of accumulated write-offs and the total number of accumulated write-offs.

Optionally, the payment transaction further includes a hash index pointing to a previous payment transaction whose certificate has been stored on the blockchain; and the payment write-off result transaction further includes a hash index pointing to a previous payment write-off transaction whose certificate has been stored on the blockchain, and a hash index pointing to the payment transaction corresponding to the payment write-off transaction.

Optionally, the payment information includes a payment amount; the payee system maintains the total amount of accumulated write-offs and the total number of accumulated write-offs in the payment write-off transaction corresponding to the last node of the payment write-off transaction linked list; and the second construction unit is configured to: obtain the payment write-off transaction corresponding to the last node of the current payment write-off transaction linked list, and generate a hash index of the payment write-off transaction corresponding to the last node of the linked list; generate a hash index of the detected payment transaction; determine the total amount of accumulated write-offs in the payment write-off transaction based on the total amount of accumulated write-offs maintained by the payee system and the payment amount included in the payment transaction; determine the total number of accumulated write-offs in the payment write-off transaction based on the total number of accumulated write-offs maintained by the payee system; and construct the payment write-off transaction based on the payment write-off result, the hash index of the payment write-off transaction corresponding to the last node of the linked list, the hash index of the payment transaction, the total amount of accumulated write-offs, and the total number of accumulated write-offs in the payment write-off transaction.

Optionally, the second publishing unit is configured to: detect whether the sum of the total amount of accumulated write-offs maintained by the payee system and the payment amount is the same as the total amount of accumulated payments in the payment transaction, and detect whether the number of accumulated write-offs maintained by the payee system plus one is the same as the total number of accumulated payments in the payment transaction; and if both are yes, publish the payment write-off transaction to the blockchain for certificate storage.

Optionally, the apparatus further includes the following: an update unit, configured to: after the payment write-off transaction is published to the blockchain for certificate storage, update the total amount of accumulated write-offs and the total number of accumulated write-offs maintained by the payee system based on the total amount of accumulated write-offs and the total number of accumulated write-offs in the payment write-off transaction.

Optionally, the apparatus further includes the following: a second monitoring unit, configured to monitor a payment settlement certificate transaction that is published to the blockchain by the payment system; and a resetting unit, configured to clear the total amount of accumulated write-offs and the total number of accumulated write-offs maintained by the payee system in response to the payment settlement certificate transaction.

According to a fifth aspect of the present application, an electronic device is provided, including the following: a processor; and a memory, configured to store a machine executable instruction, where by reading and executing a machine executable instruction that is stored in the memory and corresponds to control logic of blockchain-based settlement, the processor is enabled to perform the following operations: monitoring a settlement request transaction of a payee system whose certificate has been stored on the blockchain; in response to the detected payment settlement request transaction, obtaining a target payment transaction corresponding to the last node of a payment transaction linked list comprising payment transactions whose certificates have been stored on the blockchain in a payment order, obtaining a target payment write-off transaction corresponding to the last node of a payment write-off transaction linked list comprising payment write-off transactions whose certificates have been stored on the blockchain in a payment write-off order, where the payment transaction includes an accumulated value corresponding to accumulation of unsettled transactions up to the payment transaction in the payment transaction linked list, and the payment write-off transaction includes an accumulated value corresponding to accumulation of unsettled transactions up to the payment write-off transaction in the payment write-off transaction linked list; determining whether an accumulated value in the target payment transaction is the same as an accumulated value in the target payment write-off transaction; and if yes, performing fund settlement based on the accumulated value in the target payment transaction or the target payment write-off transaction.

According to a sixth aspect of the present application, an electronic device is provided, including the following: a processor; and a memory, configured to store a machine executable instruction, where by reading and executing a machine executable instruction that is stored in the memory and corresponds to control logic of blockchain-based settlement, the processor is enabled to perform the following operations: in response to a payment settlement request initiated by a client device, constructing a settlement request transaction based on the settlement request; and publishing the payment settlement request transaction to the blockchain for certificate storage, so that a payment system monitors the payment settlement request transaction of the payee system whose certificate has been stored on the blockchain; in response to the detected payment settlement request transaction, obtains a target payment transaction corresponding to the last node of a payment transaction linked list comprising payment transactions whose certificates have been stored on the blockchain in a payment order, obtains a target payment write-off transaction corresponding to the last node of a payment write-off transaction linked list comprising payment write-off transactions whose certificates have been stored on the blockchain in a payment write-off order; determines whether an accumulated value in the target payment transaction is the same as an accumulated value in the target payment write-off transaction; and if yes, performs fund settlement based on the accumulated value in the target payment transaction or the target payment write-off transaction, where the payment transaction includes an accumulated value corresponding to accumulation of unsettled transactions up to the payment transaction in the payment transaction linked list, and the payment write-off transaction includes an accumulated value corresponding to accumulation of unsettled transactions up to the payment write-off transaction in the payment write-off transaction linked list.

The payment system can complete fund settlement at an agreed settlement time point without interacting with the payee system. When detecting a settlement request transaction of a payee whose certificate has been stored on the blockchain, the payment system uses the payment transaction and the payment write-off transaction whose certificates have been stored on the blockchain to perform account reconciliation and complete fund settlement. Because the payee system no longer participates in the account reconciliation and the fund settlement, the fund settlement can be implemented at any time, increasing flexibility of the fund settlement.

DESCRIPTION OF IMPLEMENTATIONS

Figure 1:
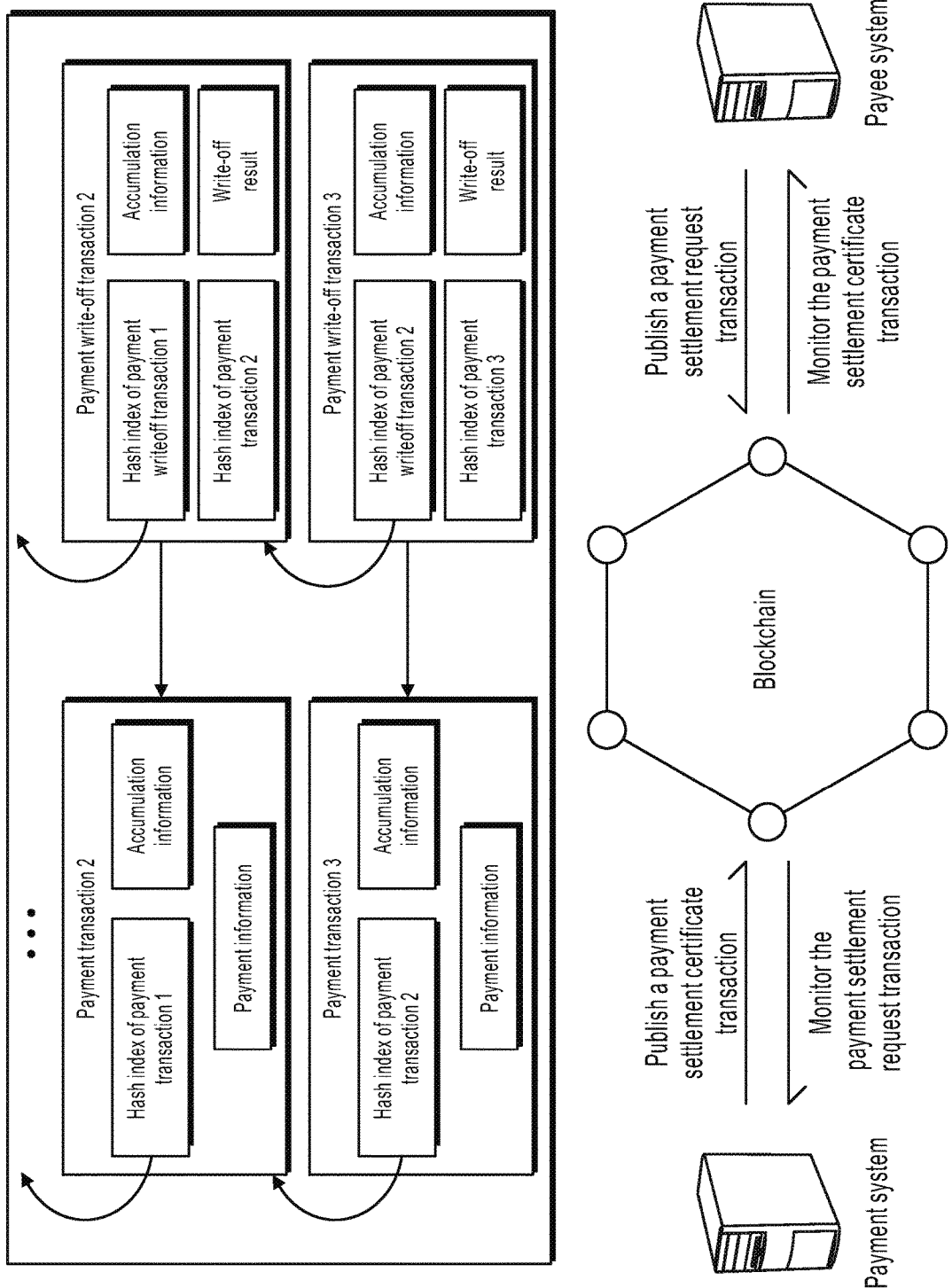
FIG. 1 is a schematic networking diagram illustrating a blockchain-based settlement method, according to an example implementation of the present specification.

Example implementations are described in detail here, and examples of the example implementations are presented in the accompanying drawings. When the following description relates to the accompanying drawings, unless specified otherwise, same numbers in different accompanying drawings represent same or similar elements. Implementations described in the following example implementations do not represent all implementations consistent with the present specification. On the contrary, the implementations are only examples of apparatuses and methods that are described in the appended claims in detail and consistent with some aspects of the present specification.

The terms used in the present specification are merely for illustrating specific implementations, and are not intended to limit the present specification. The terms "a" and "the" of singular forms used in the present specification and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", "third", etc. may be used in the present specification to describe various types of information, the information should not be limited by these terms. These terms are only used to differentiate between information of the same type. For example, without departing from the scope of the present specification, first information can also be referred to as second information, and similarly, the second information can also be referred to as the first information. Depending on the context, for example, the word "if" used here can be explained as "while", "when", or "in response to determining".

In some scenarios, after a user purchases some services or goods, a payee system generates a bill for the user. The user needs to pay for these services or goods by using a payment system.

After receiving funds paid by the user, the payment system can deposit the funds into an intermediate account and send a payment write-off message to the payee system to write off the bill generated for the user. The payment system and the payee system agree on a settlement time point (such as early morning of each day) for settlement.

For example, the payment system can perform account reconciliation with the payee system in the early morning of each day. After the account reconciliation is completed, the payment system can transfer the accumulated payment funds between the previous settlement time point and the current settlement time point to the payee system, so as to complete the fund settlement.

However, in such scenarios, the payment system and the payee system can perform settlement only at the agreed time point, causing inflexibility of the fund settlement.

In view of the previous description, the present specification provides a technical solution in which the payment system performs fund settlement at any time based on the certificate storage mechanism of the blockchain where data published to the blockchain is stored in the blockchain, creating an immutable record to be verified later.

During implementation, after receiving a payment message sent by the user, the payment system can publish a payment transaction for the payment message to the blockchain for certificate storage. After detecting the payment transaction, the payee system can perform payment write-off, construct a payment write-off transaction based on a payment write-off result, and publish the payment write-off transaction to the blockchain for certificate storage.

Based on the previous description, there are two linked lists on the blockchain for certificate storage: payment transaction linked list comprising payment transactions whose certificates have been stored on the blockchain in a payment order; and payment write-off transaction linked list comprising payment write-off transactions whose certificates have been stored on the blockchain in a write-off order.

The payment transaction includes an accumulated value corresponding to accumulation of unsettled transactions up to the current payment transaction in the payment transaction linked list. The payment write-off transaction includes an accumulated value corresponding to accumulation of unsettled transactions up to the current payment write-off transaction in the payment write-off transaction linked list.

After detecting a payment settlement request initiated by a client device, the payee system can construct a payment settlement request transaction based on the payment settlement request, and publish the payment settlement request transaction to the blockchain for certificate storage.

When detecting the payment settlement request transaction, the payment system can obtain a payment transaction corresponding to the last node of the payment transaction linked list whose certificate has been stored on the blockchain, and a payment write-off transaction corresponding to the last node of the payment write-off transaction linked list whose certificate has been stored on the blockchain, and detect whether an accumulated value in the obtained payment transaction is the same as an accumulated value in the obtained payment write-off transaction. If yes, fund settlement is performed based on the accumulated value in the obtained payment transaction or the obtained payment write-off transaction.

It can be seen from the previous description that, on the one hand, the payment system completes fund settlement at an agreed settlement time point without interacting with the payee system. When detecting a payment settlement request transaction published on the blockchain by the payee system, the payment system uses the payment transaction and the payment write-off transaction whose certificates have been stored on the blockchain to perform account reconciliation and complete fund settlement. Because the payee system no longer participates in the account reconciliation and the fund settlement, the fund settlement can be implemented at any time, increasing flexibility of the fund settlement.

On the other hand, the payment information or the payment write-off result exchanged between the payment system and the payee system is not transmitted in a point-to-point way. Instead, the payment information or the payment write-off result is exchanged by using the certificate storage mechanism of the blockchain. Therefore, costs for exchanging the payment information or the payment write-off result can be reduced and the exchanging efficiency can be improved. In addition, due to the tamper-resistance feature of the data whose certificate has been stored on the blockchain, reliability of exchanging the payment information and the payment write-off result can be improved.

According to a third aspect, the payment transaction published to the blockchain by the payment system further includes the hash index pointing to the previous payment transaction, so that the payment transaction in the blockchain is linked to the previous payment transaction by using the hash index stored in the payment transaction. As such, the payment transaction linked list comprising payment transactions in a payment order is formed on the blockchain, so that the user can trace each payment transaction in the payment transaction linked list on the blockchain, thereby improving the traceability of payment transactions.

The payment write-off transaction published to the blockchain by the payee system further includes the hash index pointing to the previous payment write-off transaction, so that the payment write-off transaction in the blockchain is linked to the previous payment write-off transaction by using the hash index stored in the payment write-off transaction. As such, the payment write-off transaction linked list comprising payment write-off transactions in a write-off order is formed on the blockchain, so that the user can trace each payment write-off transaction in the payment write-off transaction linked list on the blockchain, thereby improving the traceability of payment write-off transactions.

In addition, the payment write-off transaction further includes a hash index pointing to the payment transaction corresponding to the payment write-off transaction, so that the payment transaction corresponding to the payment write-off transaction can be traced by using the payment write-off transaction.

According to a fourth aspect, the payment transaction published to the blockchain by the payment system further includes an accumulated value corresponding to accumulation of unsettled transactions up to the current payment transaction in the payment transaction linked list. The payment write-off transaction published to the blockchain by the payee system further includes an accumulated value corresponding to accumulation of unsettled transactions up to the current payment write-off transaction in the payment write-off transaction linked list. As such, the payment system can perform account reconciliation by using the accumulated value in the payment transaction corresponding to the last node of the payment transaction linked list and the accumulated value in the payment write-off transaction corresponding to the last node of the payment write-off transaction linked list, without a need to count an accumulated value of all payment transactions and an accumulated value of all payment write-off transactions from the previous settlement time point to the current time point, thereby largely reducing workload of the payment system during fund settlement.

FIG. 1 is a schematic networking diagram illustrating a blockchain-based settlement method, according to an example implementation of the present specification.

The networking shown in FIG. 1 includes a payment system, a payee system, and a blockchain.

The payment system can refer to an institution that provides payment services to the user. The user can complete payment by using the payment system. For example, the payment system can include ALIPAY, WeChat payment, JD payment, bank payment, etc.

It is worthwhile to note that, the payment system can be a software system mounted on a node device in the blockchain, or can be a software system mounted on a server connected to a node device in the blockchain, which is not limited in the present specification.

The payee system can be an institution that issues user consumption bills. For example, when the user pays for water, electricity, etc., the payee system can be a payee for water fee or electricity fee. For another example, when the user makes credit card repayment, the payee system can be a banking institution, etc. The previous description of the payee system is merely an example, and is not limited.

Blockchains are generally classified into three types: public blockchain, private blockchain, and consortium blockchain. In addition, there are multiple types of combinations, such as private blockchain+consortium blockchain, consortium blockchain+public blockchain, etc. The public blockchain has the highest degree of decentralization. The public blockchain is represented by bitcoins and Ethereum. Participants joining the public blockchain can read data records on the blockchain, participate in transactions, and contend for the accounting right in new blocks.

Furthermore, participants (namely, nodes) can join or exit the network freely and perform related operations. On the contrary, in the private blockchain, write permissions of the network are controlled by a certain organization or institution, and the data read permissions are specified by the organization. In short, the private blockchain can be a weakly-centralized system. There are a few participating nodes that are strictly restricted. Such type of blockchain is more suitable for use within a particular institution.

The consortium blockchain is a blockchain between the public blockchain and the private blockchain, and can implement "partial decentralization". Each node in the consortium blockchain usually has its corresponding physical institution or organization. Participants join the network through authorization and form a stakeholder consortium to jointly maintain blockchain operation.

The blockchain described in the present specification can include any type of blockchain network. In practice, any one of the public blockchain, the private blockchain, or the consortium blockchain can be used.

Certificate storage methods for a payment transaction and a payment write-off transaction are described before the settlement method provided in the present application.

Figure 2A:
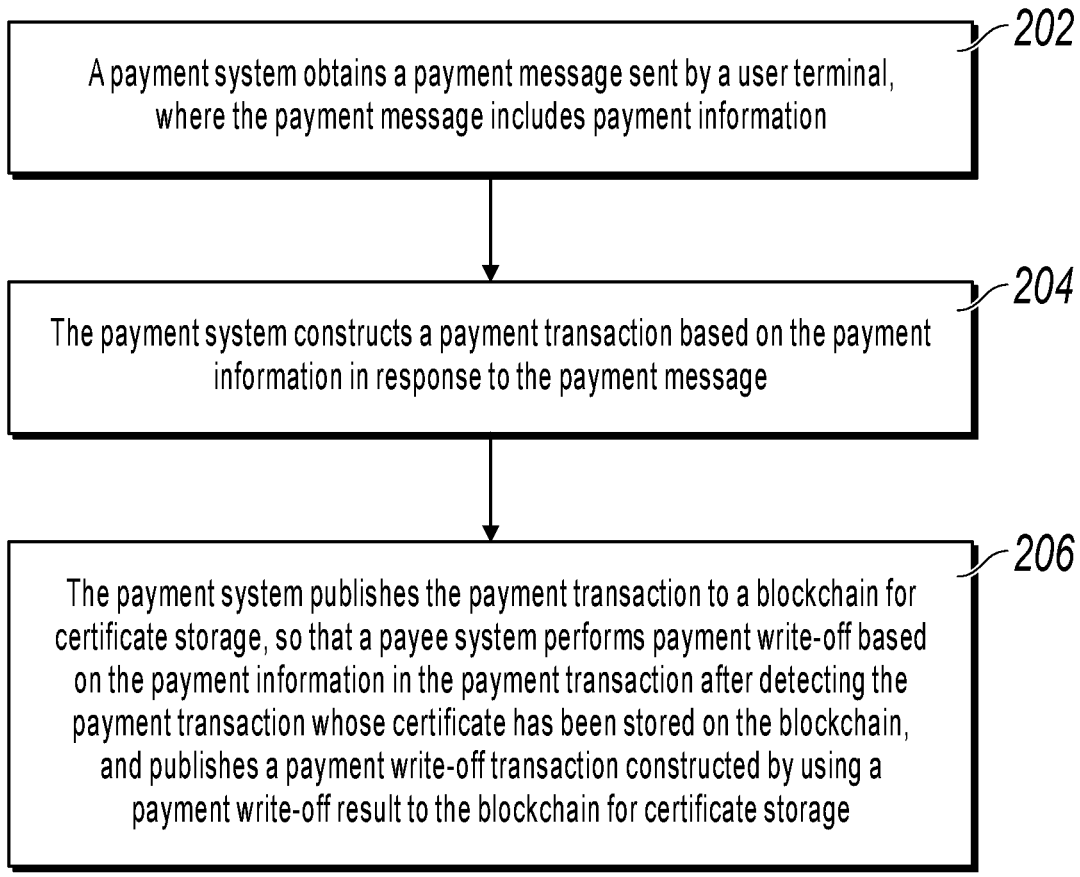
FIG. 2a is a flowchart illustrating a certificate storage method for a payment transaction, according to an example implementation of the present specification.

FIG. 2a is a flowchart illustrating a certificate storage method for a payment transaction, according to an example implementation of the present specification. The method can be applied to a payment system and can include the following steps.

Step 202: The payment system obtains a payment message sent by a user terminal, where the payment message includes payment information.

The user can perform payment on the user terminal. When detecting a payment operation initiated by the user, the user terminal can send a payment message to the payment system. The payment message includes payment information.

The payment information can include a payment amount. Certainly, the payment information can further include a payer identifier (i.e., a user identifier), a payee identifier, etc. The previous description of the payment information is merely an example, and is not limited.

Step 204: The payment system constructs a payment transaction based on the payment information in response to the payment message.

Figure 2B:
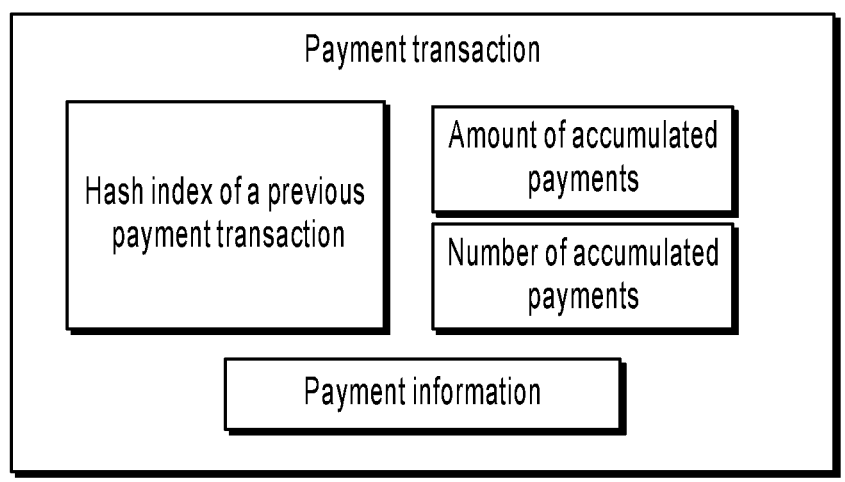
FIG. 2b is a schematic diagram illustrating a payment transaction, according to an example implementation of the present specification.

As shown in FIG. 2b, the payment transaction includes the following: (1) the total amount of accumulated payments corresponding to accumulation of unsettled transactions up to the payment transaction in the payment transaction linked list; (2) the total number of accumulated payments corresponding to accumulation of unsettled transactions up to the payment transaction in the payment transaction linked list; and (3) a hash index pointing to a previous payment transaction whose certificate has been stored on the blockchain.

In addition, the payment system further maintains the total amount of accumulated payments and the total number of accumulated payments in the payment transaction corresponding to the last node of the current payment transaction linked list.

For example, assume that the last node of the payment transaction linked list corresponding to the time point at which the payment settlement request transaction was last detected is the 10th node. Assume that in the time period from the time point at which the payment settlement request transaction was last detected to the current time point, five other nodes join the payment transaction linked list. The total amount of accumulated payments in the payment transaction corresponding to the 15th node of the payment transaction linked list is an accumulated value of payment amounts in the payment transactions corresponding to the 11th node to the 15th node. The total number of accumulated payments in the payment transaction corresponding to the 15th node is 5.

When last node of the current payment transaction linked list is the 15th node, the payment system maintains the total amount of accumulated payments and the total number of accumulated payments in the payment transaction corresponding to the 15th node.

For example, the payment amounts in the payment transactions corresponding to the 11th node to the 15th node are 100 yuan, 200 yuan, 50 yuan, 50 yuan, and 100 yuan, respectively. The total amount of accumulated payments in the payment transaction corresponding to the 15th node is 500 yuan, and the total number of accumulated payments in the payment transaction corresponding to the 15th node is 5. In such case, the total amount of accumulated payments maintained by the payment system is 500 yuan, and the total number of accumulated payments maintained by the payment system is 5.

The total amount of accumulated payments and the total number of accumulated payments maintained by the payment system are updated as payment transactions are published to the blockchain, and are cleared after the fund settlement is completed.

In the specification of the present application, the payment system constructs a payment transaction based on the payment information in response to the payment message.

During the construction, the payment system can obtain the payment transaction corresponding to the last node of the current payment transaction linked list, and generate a hash index of the obtained payment transaction.

The payment system can determine the total amount of accumulated payments in the payment transaction based on the total amount of accumulated payments maintained by the payment system and the payment amount.

For example, the payment system can calculate the sum of the total amount of accumulated payments maintained by the payment system and the payment amount included in the payment message, as the total amount of accumulated payments in the payment transaction.

In addition, the payment system can also use the total number of accumulated payments maintained by the payment system plus one, as the total number of accumulated payments in the payment transaction.

The payment system can construct the payment transaction based on the payment information, the generated hash index, and the total amount of accumulated payments and the total number of accumulated payments in the payment transaction.

For example, assume that the last node of the current payment transaction linked list is the 15th node. The total amount of accumulated payments in the payment transaction corresponding to the 15th node (the 15th payment transaction for short) is 500 yuan, and the total number of accumulated payments in the 15th payment transaction is 5.

Assume that the total amount of accumulated payments maintained by the payment system is 500 yuan, and the total number of accumulated payments maintained by the payment system is 5.

Assume that the payment amount included in the payment message in the payment request is 50 yuan.

The payment system can generate a hash index of the 15th payment transaction.

The payment system can calculate the sum (i.e., 550 yuan) of the total amount (i.e., 500 yuan) of accumulated payments and the payment amount (i.e., 50 yuan) included in the payment message, as the total amount (i.e., 550 yuan) of accumulated payments in the payment transaction.

The payment system can also use the total number (i.e., 5) of accumulated payments plus one, as the total number (i.e., 6) of accumulated payments in the payment transaction.

The payment system can construct the payment transaction based on the hash index of the 15th payment transaction, the total amount (550 yuan) of accumulated payments in the payment transaction, and the total number (6) of accumulated payments in the payment transaction. The constructed payment transaction is the 16th payment transaction in the payment transaction linked list.

Step 206: The payment system publishes the payment transaction to the blockchain for certificate storage, so that the payee system performs payment write-off based on the payment information in the payment transaction after detecting the payment transaction whose certificate has been stored on the blockchain, and publishes a payment write-off transaction constructed by using a payment write-off result to the blockchain for certificate storage.

To ensure book consistency between the payment system and the payee system, that is, to ensure that the accumulated value in the payment transaction published by the payment system is the same as the accumulated value in the payment write-off transaction published by the payee system for the payment transaction, when the payment transaction is published, the service system needs to verify the payment transaction corresponding to the last node of the current payment transaction linked list and the payment write-off transaction corresponding to the last node of the current payment write-off transaction linked list. The constructed payment transaction is published to the blockchain for certificate storage only after the verification succeeds.

During implementation, the payment system can detect whether the accumulated value in the payment transaction (denoted as payment transaction 1 in the following) corresponding to the last node of the current payment transaction linked list is the same as the accumulated value in the payment write-off transaction (denoted as payment write-off transaction 1 in the following) corresponding to the last node of the current payment write-off linked list; and if yes, publish the payment transaction to the blockchain for certificate storage.

The payment system can detect whether the total amount of accumulated payments in payment transaction 1 is the same as the total amount of accumulated write-offs in payment write-off transaction 1, and whether the total number of accumulated payments in payment transaction 1 is the same as the total number of accumulated write-offs in payment write-off transaction 1.

If the total amount of accumulated payments in payment transaction 1 is the same as the total amount of accumulated write-offs in payment write-off transaction 1, and the total number of accumulated payments in payment transaction 1 is the same as the total number of accumulated write-offs in payment write-off transaction 1, the payment system publishes the payment transaction to the blockchain for certificate storage.

For example, assume that the last node of the current payment transaction linked list is the 15th node. The total amount of accumulated payments in the payment transaction corresponding to the 15th node is 500 yuan, and the total number of accumulated payments in the payment transaction corresponding to the 15th node is 5.

Assume that the last node of the current payment write-off transaction linked list is the 15th node. The total amount of accumulated write-offs in the payment write-off transaction corresponding to the 15th node is 500 yuan, and the total number of accumulated write-offs in the payment write-off transaction corresponding to the 15th node is 5.

When publishing the 16th payment transaction on the blockchain, the payment system can detect whether the total amount (i.e., 500 yuan) of accumulated payments corresponding to the 15th node of the payment transaction linked list is the same as the total amount (i.e., 500 yuan) of accumulated write-offs corresponding to the payment write-off transaction linked list, and whether the total number (i.e., 5) of accumulated payments corresponding to the 15th node of the payment transaction linked list is the same as the total number (i.e., 5) of accumulated write-offs corresponding to the payment write-off transaction linked list.

In the present example, both are yes, and therefore the payment system can publish the 16th payment transaction to the blockchain for certificate storage. After the certificate storage, the 16th node is formed in the payment transaction linked list on the blockchain.

In addition, in the implementation provided in the present specification, after publishing the constructed payment transaction to the blockchain for certificate storage, the payment system can update the total amount of accumulated payments maintained by the payment system, by using the total amount of accumulated payments in the payment transaction, and update the total number of accumulated payments maintained by the payment system, by using the total number of accumulated payments in the payment transaction.

The example in step 204 is used again. After publishing the constructed 16th payment transaction to the blockchain for certificate storage, the payment system can update the total amount of accumulated payments maintained by the payment system from 500 yuan to 550 yuan, and update the total number of accumulated payments maintained by the payment system from 5 to 6.

It can be seen from the previous description that, on the one hand, the payment system transmits the payment information to the payee system by using the certificate storage mechanism of the blockchain instead of using a point-to-point method. Therefore, costs for transmitting the payment information can be reduced and the exchanging efficiency can be improved. In addition, due to the tamper-resistance feature of the data whose certificate has been stored on the blockchain, reliability of transmitting the exchanged payment information can be improved.

On the other hand, the payment transaction published to the blockchain by the payment system further includes the hash index pointing to the previous payment transaction, so that the payment transaction in the blockchain is linked to the previous payment transaction by using the hash index stored in the payment transaction. As such, the payment transaction linked list comprising payment transactions in a payment order is formed on the blockchain, so that the user can trace each payment transaction in the payment transaction linked list on the blockchain, thereby improving the traceability of payment transactions.

Figure 3A:
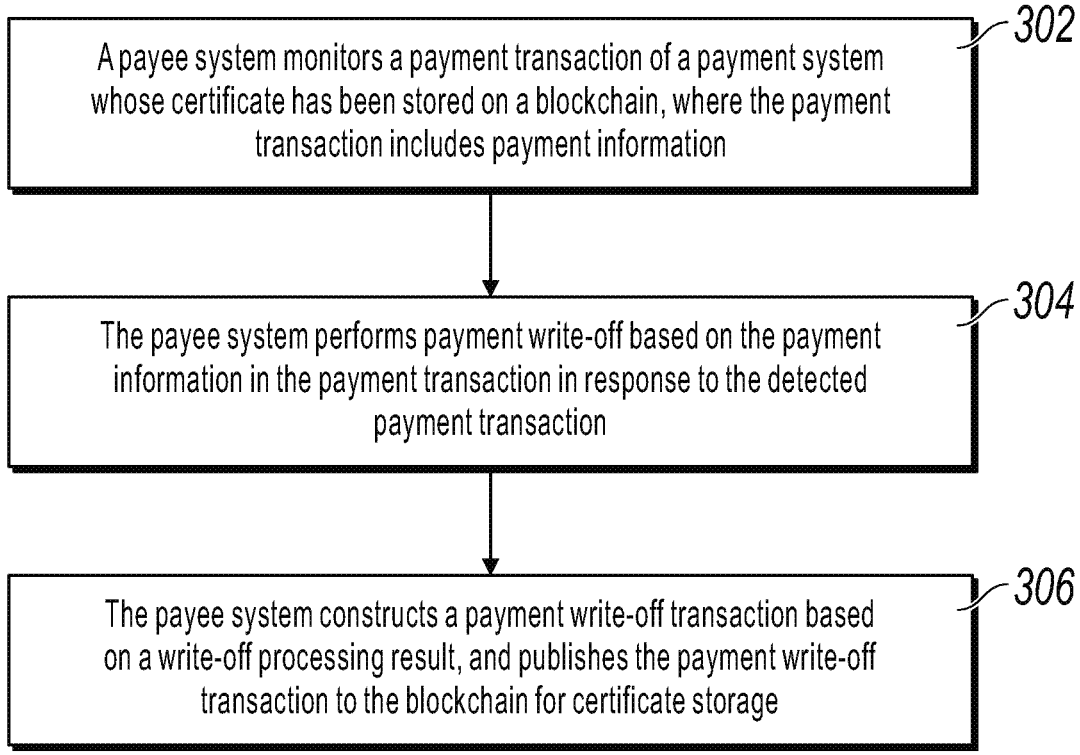
FIG. 3a is a flowchart illustrating a certificate storage method for a payment write-off transaction, according to an example implementation of the present specification.

FIG. 3*a* is a flowchart illustrating a certificate storage method for a payment write-off transaction, according to an example implementation of the present specification. The method can be applied to a payee system and can include the following steps.

Step 302: The payee system monitors the payment transaction of the payment system whose certificate has been stored on the blockchain, where the payment transaction includes payment information.

Step 304: The payee system performs payment write-off based on the payment information in the payment transaction in response to the detected payment transaction.

Step 306: The payee system constructs the payment write-off transaction based on a write-off processing result, and publishes the payment write-off transaction to the blockchain for certificate storage.

Figure 3B:
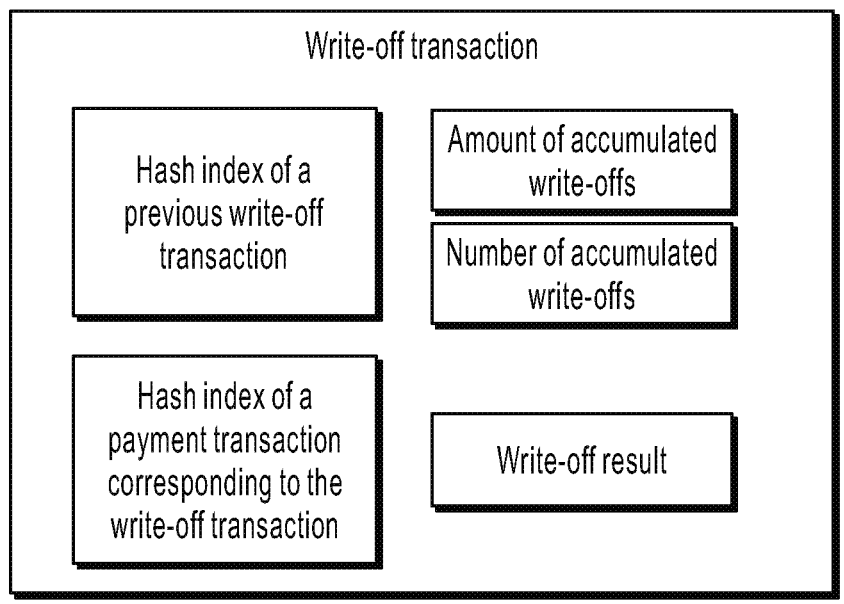
FIG. 3b is a schematic diagram illustrating a payment write-off transaction, according to an example implementation of the present specification.

As shown in FIG. 3*b*, the payment write-off transaction includes the following: (1) the total amount of accumulated write-offs corresponding to accumulation of unsettled transactions up to the payment write-off transaction in the payment write-off transaction linked list; (2) the total number of accumulated write-offs corresponding to accumulation of unsettled transactions up to the payment write-off transaction in the payment write-off transaction linked list; (3) a hash index pointing to a previous payment write-off transaction whose certificate has been stored on the blockchain; and (4) a hash index pointing to the detected payment transaction, that is, a hash index of the payment transaction corresponding to the payment write-off transaction.

In addition, the payee system maintains the total amount of accumulated write-offs and the total number of accumulated write-offs in the payment write-off transaction corresponding to the last node of the payment write-off transaction linked list.

For example, assume that the last node of the payment write-off transaction linked list corresponding to the time point at which the settlement request was last detected is the 10th node. Assume that in the time period from the time point at which the settlement request was last detected to the current time point, five other nodes join the payment write-off transaction linked list. The total amount of accumulated write-offs in the payment write-off transaction corresponding to the 15th node of the payment write-off transaction linked list is an accumulated value of payment amounts in the payment write-off transactions corresponding to the 11th node to the 15th node. The total number of accumulated write-offs in the payment write-off transaction corresponding to the 15th node is 5.

The last node of the current payment write-off transaction linked list is the 15th node. The payee system maintains the total amount of accumulated write-offs and the total number of accumulated write-offs in the payment write-off transaction corresponding to the 15th node.

For example, the write-off amounts in the payment write-off transactions corresponding to the 11th node to the 15th node are 100 yuan, 200 yuan, 50 yuan, 50 yuan, and 100 yuan, respectively. The total amount of accumulated write-offs in the payment write-off transaction corresponding to the 15th node is 500 yuan, and the total number of accumulated write-offs in the payment write-off transaction corresponding to the 15th node is 5. In such case, the total amount of accumulated write-offs maintained by the payee system is 500 yuan, and the total number of accumulated write-offs maintained by the payee system is 5.

Values of variables of the total amount of accumulated write-offs and the total number of accumulated write-offs are updated as payment write-off transactions are published to the blockchain, and are cleared after the fund settlement is completed.

In the specification of the present application, the payee system can construct the payment write-off transaction based on a payment write-off result.

During construction, the payee system can obtain the payment write-off transaction corresponding to the last node of the current payment write-off transaction linked list, and generate a hash index of the payment write-off transaction corresponding to the last node of the linked list.

The payee system can generate a hash index of the detected payment transaction.

The payee system can determine the total amount of accumulated write-offs in the payment write-off transaction based on the total amount of accumulated write-offs maintained by the payee system and the payment amount included in the payment transaction.

For example, the payee system can calculate the sum of the total amount of accumulated write-offs maintained by the payee system and the payment amount included in the payment transaction, as the total amount of accumulated write-offs in the payment write-off transaction.

The payee system can determine the total number of accumulated write-offs in the payment write-off transaction based on the total number of accumulated write-offs maintained by the payee system.

For example, the payee system uses the value of the variable of the total number of accumulated write-offs plus one, as the total number of accumulated target write-offs.

The payee system can construct the payment write-off transaction based on the payment write-off result, the hash index of the payment write-off transaction corresponding to the last node of the linked list, the hash index of the payment transaction, the total amount of accumulated write-offs, and the total number of accumulated write-offs in the payment write-off transaction.

For example, assume that the payment transaction detected by the payee system is the 16th payment transaction in the above-mentioned payment transaction linked list. The payment amount in the payment information included in the 16th payment transaction is 50 yuan.

Assume that the last node of the current payment write-off transaction linked list is the 15th node. The total amount of accumulated write-offs in the payment write-off transaction corresponding to the 15th node (the 15th payment write-off transaction for short) is 500 yuan, and the total number of accumulated write-offs in the 15th payment write-off transaction is 5.

Assume that the total amount of accumulated write-offs maintained by the payee system is 500 yuan, and the total number of accumulated write-offs maintained by the payee system is 5.

The payee system can generate a hash index of the 15th payment write-off transaction, and a hash index of the 16th payment transaction.

The payee system can calculate the sum (i.e., 550 yuan) of the total amount (i.e., 500 yuan) of accumulated write-offs maintained by the payee system and the payment amount (i.e., 50 yuan) included in the 16th payment transaction, as the total amount of accumulated write-offs in the 16th payment write-off transaction.

The payee system can also use the total number (i.e., 5) of accumulated write-offs maintained by the payee system plus one, as the total number (i.e., 6) of accumulated write-offs in the 16th payment write-off transaction.

The payee system can construct the 16th payment write-off transaction based on the hash index of the 15th payment write-off transaction, the hash index of the 16th payment transaction, the total amount (550 yuan) of accumulated write-offs in the 16th payment write-off transaction, and the total number (6) of accumulated write-offs in the 16th payment write-off transaction.

In the implementation of the present specification, after constructing the payment write-off transaction based on the payment write-off result, the payee system can publish the payment write-off transaction to the blockchain for certificate storage.

During the publishing, to ensure book consistency between the payment system and the payee system, when publishing the constructed payment write-off transaction, the payee system further needs to verify the books of the payment system and the payee system. The payee system publishes the constructed payment write-off transaction to the blockchain for certificate storage only after the verification succeeds.

During implementation, the payee system can detect whether the sum of the total amount of accumulated write-offs maintained by the payee system and the payment amount included in the detected payment transaction is the same as the total amount of accumulated payments in the payment transaction, and whether the value of the variable of the total number of accumulated write-offs plus one is the same as the total number of accumulated payments in the payment transaction.

If the sum of the total amount of accumulated write-offs maintained by the payee system and the payment amount is the same as the total amount of accumulated payments in the payment transaction, and the value of the variable of the total number of accumulated write-offs plus one is the same as the total number of accumulated payments in the payment transaction, the payment write-off transaction is published to the blockchain for certificate storage.

For example, assume that the total amount of accumulated write-offs maintained by the payee system is 500 yuan, and the payment amount included in the detected payment transaction is 50 yuan. The total amount of accumulated payments included in the payment transaction is 550 yuan.

The value of the variable of the total number of accumulated write-offs is 5, and the total number of accumulated payments included in the payment transaction is 6.

The payee system can detect whether the sum (i.e., 550 yuan) of the total amount (i.e., 500 yuan) of accumulated write-offs maintained by the payee system and the payment amount (i.e., 50 yuan) included in the detected payment transaction is the same as the total amount (i.e., 550 yuan) of accumulated payments in the payment transaction, and whether the value (i.e., 5) of the variable of the total number of accumulated write-offs plus one is the same as the total number (i.e., 6) of accumulated payments in the payment transaction.

In the present example, both are yes, and therefore the payee system can publish the constructed payment write-off transaction to the blockchain for certificate storage.

It can be seen from the previous description that, on the one hand, the payee system transmits the payment write-off result to the payment system by using the certificate storage mechanism of the blockchain instead of using a point-to-point method. Therefore, costs for transmitting the payment write-off result can be reduced and the exchanging efficiency can be improved. In addition, due to the tamper-resistance feature of the data whose certificate has been stored on the blockchain, reliability of transmitting the exchanged payment write-off result can be improved.

On the other hand, the payment write-off transaction published to the blockchain by the payee system further includes the hash index pointing to the previous payment write-off transaction, so that the payment write-off transaction in the blockchain is linked to the previous payment write-off transaction by using the hash index stored in the payment write-off transaction. As such, the payment write-off transaction linked list comprising payment write-off transactions in a write-off order is formed on the blockchain, so that the user can trace each payment write-off transaction in the payment write-off transaction linked list on the blockchain, thereby improving the traceability of payment write-off transactions.

In addition, the payment write-off transaction further includes a hash index pointing to the payment transaction corresponding to the payment write-off transaction, so that the payment transaction corresponding to the payment write-off transaction can be traced by using the payment write-off transaction.

Figure 4:
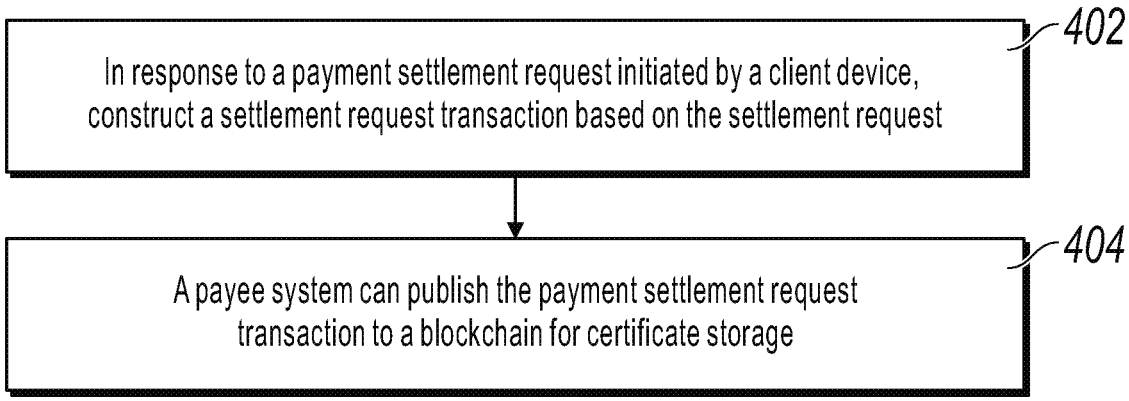
FIG. 4 is a schematic diagram illustrating a blockchain-based settlement method, according to an example implementation of the present specification.
Figure 5:
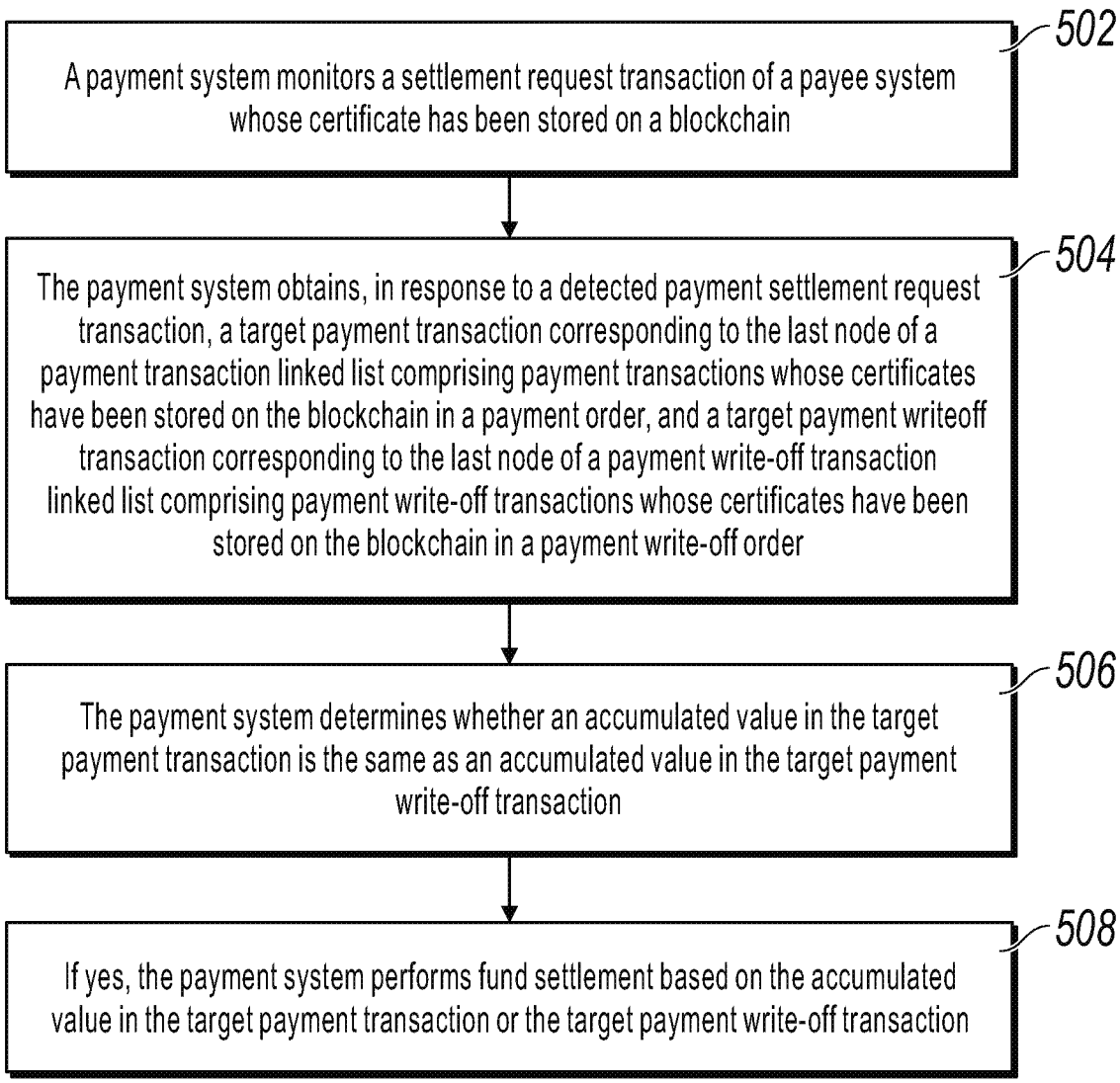
FIG. 5 is a schematic diagram illustrating another blockchain-based settlement method, according to an example implementation of the present specification.

After the certificate storage methods for the payment transaction and the payment write-off transaction are described, the following describes in detail a blockchain-based settlement method provided in the present application with reference to FIG. 4 and FIG. 5. The blockchain-based settlement method can be implemented by using the following method.

Step 402: In response to a payment settlement request initiated by a client device, construct a settlement request transaction based on the settlement request.

The payee system corresponds to a client device. A manager can initiate a payment settlement operation by using the client device. When detecting the payment settlement operation initiated by the manager, the client device can send a payment settlement request to the payee system, and the payee system can construct a payment settlement request transaction based on the payment settlement request.

Step 404: The payee system can publish the payment settlement request transaction to the blockchain for certificate storage.

Step 502: The payment system monitors a settlement request transaction of the payee system whose certificate has been stored on the blockchain.

Step 504: The payment system obtains, in response to the detected payment settlement request transaction, a target payment transaction corresponding to the last node of a payment transaction linked list comprising payment transactions whose certificates have been stored on the blockchain in a payment order, and a target payment write-off transaction corresponding to the last node of a payment write-off transaction linked list comprising payment write-off transactions whose certificates have been stored on the blockchain in a payment write-off order.

The payment transaction includes an accumulated value corresponding to accumulation of unsettled transactions up to the payment transaction in the payment transaction linked list, and the payment write-off transaction includes an accumulated value corresponding to accumulation of unsettled transactions up to the payment write-off transaction in the payment write-off transaction linked list.

Step 506: The payment system determines whether an accumulated value in the target payment transaction is the same as an accumulated value in the target payment write-off transaction.

Step 508: If yes, the payment system performs fund settlement based on the accumulated value in the target payment transaction or the target payment write-off transaction.

Certificate storage for the payment transaction is performed by using the method shown in FIG. 2*a*, so that the payment transaction linked list is published on the blockchain for certificate storage.

Certificate storage for the payment write-off transaction is performed by using the method shown in FIG. 3*a*, so that the payment write-off transaction linked list is published on the blockchain for certificate storage.

(1) Payment Transaction Linked List

The payment transaction linked list is a linked list comprising payment transactions whose certificates have been stored on the blockchain in a transaction order.

The payment transaction in the payment transaction linked list includes an accumulated value corresponding to accumulation of unsettled transactions up to the current payment transaction in the payment transaction linked list.

The accumulated value can be an accumulated value of accumulation from the last node corresponding to a time point at which a payment settlement request transaction was last detected to the current payment transaction in the payment transaction linked list.

For example, assume that the last node of the payment transaction linked list corresponding to the time point at which the payment settlement request transaction was last detected is the 10th node. Assume that in the time period from the time point at which the payment settlement request transaction was last detected to the current time point, five other nodes join the payment transaction linked list. Nodes following the 11th node are all unsettled nodes. The accumulated value in the payment transaction corresponding to the 15th node of the payment transaction linked list is an accumulated value of accumulation from the payment transaction corresponding to the 11th node to the payment transaction corresponding to the 15th node.

The accumulated value in the payment transaction includes the total amount of accumulated payments and the total number of accumulated payments. The previous description of the accumulated value in the payment transaction is merely an example, and is not limited.

(2) Payment Write-Off Transaction Linked List

The payment write-off transaction linked list is a linked list comprising payment write-off transactions whose certificates have been stored on the blockchain in a write-off order.

The payment write-off transaction in the payment write-off transaction linked list includes an accumulated value corresponding to accumulation of unsettled transactions up to the current payment write-off transaction in the payment write-off transaction linked list.

The accumulated value can be an accumulated value of accumulation from the last node corresponding to a time point at which a settlement request was last detected to the current payment write-off transaction in the payment write-off transaction linked list.

For example, assume that the last node of the payment write-off transaction linked list corresponding to the time point at which the payment settlement request was last detected is the 11th node. Assume that in the time period from the time point at which the settlement request was last detected to the current time point, six other nodes join the payment write-off transaction linked list. Nodes following the 11th node are all unsettled nodes. The accumulated value in the payment write-off transaction corresponding to the 17th node of the payment write-off transaction linked list is an accumulated value of accumulation from the payment write-off transaction corresponding to the 12th node to the payment write-off transaction corresponding to the 17th node.

The accumulated value in the payment write-off transaction includes the total amount of accumulated write-offs and the total number of accumulated write-offs. The previous description of the accumulated value in the payment write-off transaction is merely an example, and is not limited.

In the implementation provided in the present specification, the payment system can determine, in response to the detected payment settlement request transaction, whether the accumulated value in the target payment transaction corresponding to the last node of the payment transaction linked list whose certificate has been stored on the blockchain is the same as the accumulated value in the target payment write-off transaction corresponding to the last node of the payment write-off transaction linked list.

During implementation, the payment system can obtain the target payment transaction corresponding to the last node of the payment transaction linked list whose certificate has been stored on the blockchain, and the target payment write-off transaction corresponding to the last node of the payment write-off transaction linked list whose certificate has been stored on the blockchain.

The payment system can detect whether the total amount of accumulated payments included in the target payment transaction is the same as the total amount of accumulated write-offs included in the target payment write-off transaction, and whether the total number of accumulated payments included in the target payment transaction is the same as the total number of accumulated write-offs included in the target payment write-off transaction.

If the total amount of accumulated payments included in the target payment transaction is the same as the total amount of accumulated write-offs included in the target payment write-off transaction, and the total number of accumulated payments included in the target payment transaction is the same as the total number of accumulated write-offs included in the target payment write-off transaction, the payment system can perform fund settlement based on the total amount of accumulated payments included in the target payment transaction or the total amount of accumulated write-offs included in the target payment write-off transaction.

In addition, in the implementation of the present specification, after the fund settlement is completed, the payment system can construct a payment settlement certificate transaction based on a fund settlement result, and publish the payment settlement certificate transaction to the blockchain for certificate storage.

In addition, after the fund settlement is completed, the payment system can clear the total amount of accumulated payments and the total number of accumulated payments maintained by the payment system.

After detecting the payment settlement certificate transaction, the payee system can clear the total amount of accumulated write-offs and the total number of accumulated write-offs maintained by the payee system.

For example, assume that when the payment system detects the payment settlement request transaction, the last node in the payment transaction linked list is the 18th node, and the payment transaction corresponding to the 18th node is briefly referred to as the 18th payment transaction. The last node in the payment write-off transaction linked list is the 18th node, and the payment write-off transaction corresponding to the 18th node is briefly referred to as the 18th payment write-off transaction.

Assume that the total amount of accumulated payments of the 18th payment transaction is 800 yuan, and the total number of accumulated payments of the 18th payment transaction is 8. The total amount of accumulated write-offs of the 18th payment write-off transaction is 800 yuan, and the total number of accumulated write-offs of the 18th payment write-off transaction is 8.

Assume that the value of the variable of the total amount of accumulated payments is 800 yuan, and the value of the variable of the total number of accumulated payments is 8. The value of the variable of the total amount of accumulated write-offs is 800 yuan, and the value of the variable of the total number of accumulated write-offs is 8.

When detecting the payment settlement request transaction, the payment system can determine whether the total amount (i.e., 800 yuan) of accumulated payments in the 18th payment transaction is the same as the total amount (i.e., 800 yuan) of accumulated write-offs in the 18th payment write-off transaction, and whether the total number (i.e., 8) of accumulated payments in the 18th payment transaction is the same as the total number (i.e., 8) of accumulated write-offs in the 18th payment write-off transaction.

In the present example, because both are yes, the payment system can perform fund settlement based on the total amount (i.e., 800 yuan) of accumulated payments in the 18th payment transaction or the total amount (i.e., 800 yuan) of accumulated write-offs in the 18th payment write-off transaction.

After the settlement is completed, the payment system can clear the total amount of accumulated payments and the total number of accumulated payments maintained by the payment system.

In addition, the payment system can construct a payment settlement certificate transaction, and publish the payment settlement certificate transaction to the blockchain for certificate storage.

After detecting the payment settlement certificate transaction, the payee system can clear the total amount of accumulated write-offs and the total number of accumulated write-offs maintained by the payee system.

It can be seen from the previous description that, on the one hand, the payment system completes fund settlement at an agreed settlement time point without interacting with the payee system. When detecting a payment settlement request transaction published on the blockchain by the payee system, the payment system uses the payment transaction and the payment write-off transaction whose certificates have been stored on the blockchain to perform account reconciliation and complete fund settlement. Because the payee system no longer participates in the account reconciliation and the fund settlement, the fund settlement can be implemented at any time, increasing flexibility of the fund settlement.

On the other hand, because both the payment transaction and the payment write-off transaction whose certificates have been stored on the blockchain include the accumulated value, the payment system can perform account reconciliation directly by using the accumulated value in the payment transaction corresponding to the last node of the payment transaction linked list and the accumulated value in the payment write-off transaction corresponding to the last node of the payment write-off transaction linked list, without a need to count an accumulated value of all payment transactions and an accumulated value of all payment write-off transactions from the previous settlement time point to the current time point, thereby largely reducing workload of the payment system during fund settlement.

Figure 6:
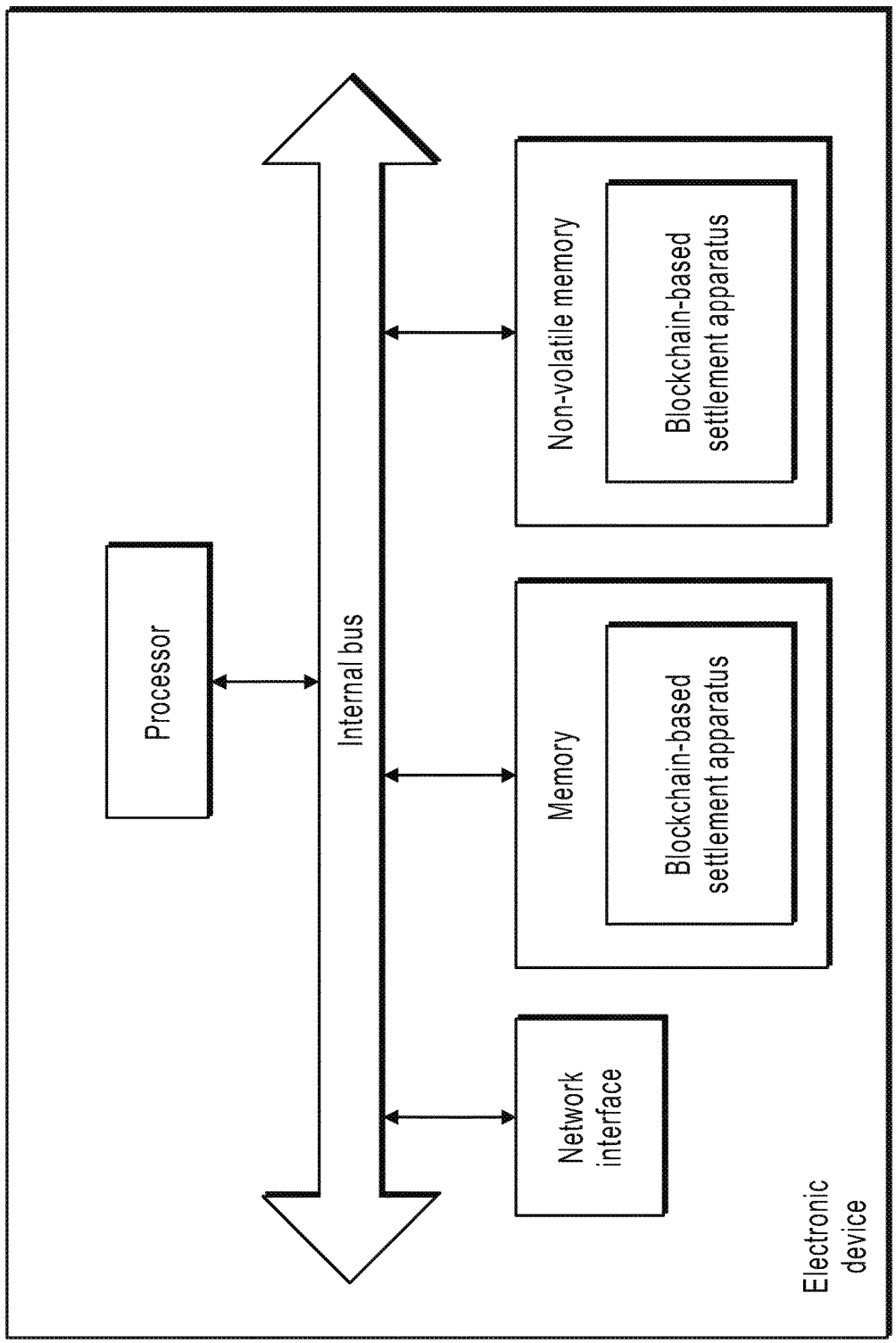
FIG. 6 is a diagram illustrating a hardware structure of an electronic device, according to an example implementation of the present specification.

Corresponding to the previous method implementation, the present specification further provides an implementation of a blockchain-based settlement apparatus. The implementation of the blockchain-based settlement apparatus in the present specification can be applied to an electronic device. The apparatus implementation can be implemented by software, or can be implemented by hardware or a combination of software and hardware. For example, the apparatus implementation is implemented by software. A logical apparatus is formed when a processor of an electronic device where the apparatus is located reads a corresponding computer program instruction in a non-volatile memory into the memory for running. In terms of hardware, FIG. 6 is a diagram of a hardware structure of an electronic device in which a block service configuration apparatus is located, according to the present specification. In addition to the processor, memory, network interface, and non-volatile memory shown in FIG. 6, the electronic device in which the apparatus is located in the implementation generally can further include other hardware based on an actual function of the electronic device. Details are omitted here for simplicity.

The electronic device can be a payment system connected to the blockchain or a payee system connected to the blockchain.

Figure 7:
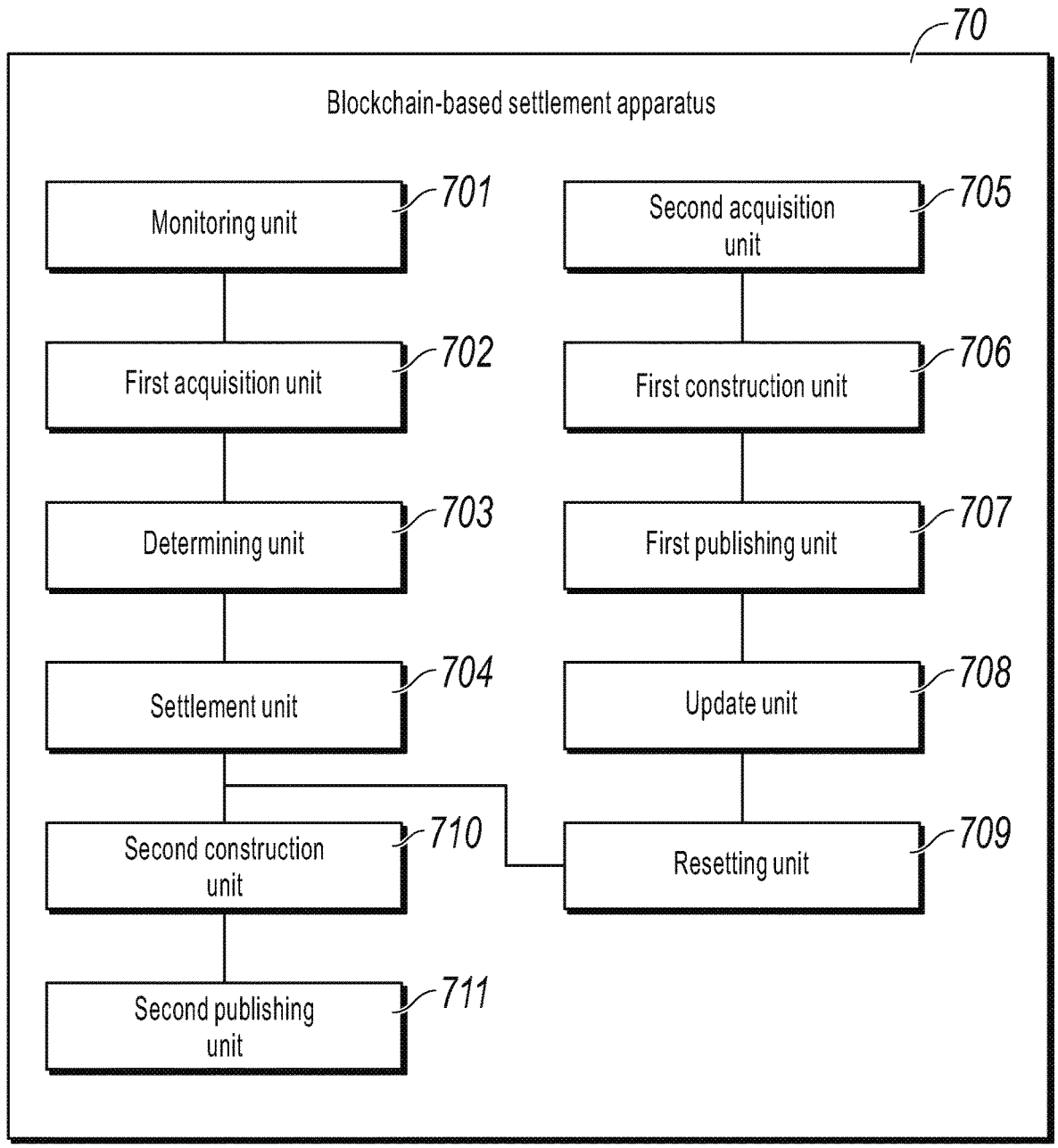
FIG. 7 is a block diagram illustrating a blockchain-based settlement apparatus, according to an example implementation of the present specification.

FIG. 7 is a block diagram illustrating a blockchain-based settlement apparatus, according to an example implementation of the present specification. The apparatus can be applied to a payment system connected to the blockchain, and can include the following units: a monitoring unit 701, configured to monitor a settlement request transaction of a payee system whose certificate has been stored on the blockchain; a first acquisition unit 702, configured to: in response to the detected payment settlement request transaction, obtain a target payment transaction corresponding to the last node of a payment transaction linked list comprising payment transactions whose certificates have been stored on the blockchain in a payment order; obtain a target payment write-off transaction corresponding to the last node of a payment write-off transaction linked list comprising payment write-off transactions whose certificates have been stored on the blockchain in a payment write-off order, where the payment transaction includes an accumulated value corresponding to accumulation of unsettled transactions up to the payment transaction in the payment transaction linked list, and the payment write-off transaction includes an accumulated value corresponding to accumulation of unsettled transactions up to the payment write-off transaction in the payment write-off transaction linked list; a determining unit 703, configured to determine whether an accumulated value in the target payment transaction is the same as an accumulated value in the target payment write-off transaction; and a settlement unit 704, configured to: if yes, perform fund settlement based on the accumulated value in the target payment transaction or the target payment write-off transaction.

Optionally, the apparatus further includes the following: a second acquisition unit 705, configured to obtain a payment message sent by a user terminal, where the payment message includes payment information; a first construction unit 706, configured to construct a payment transaction based on the payment information in response to the payment message; and a first publishing unit 707, configured to publish the payment transaction to the blockchain for certificate storage, so that the payee system performs payment write-off based on the payment information in the payment transaction after detecting the payment transaction whose certificate has been stored on the blockchain, and publishes a payment write-off transaction constructed by using a payment write-off result to the blockchain for certificate storage.

Optionally, the first publishing unit 707 is configured to: when publishing the payment transaction to the blockchain for certificate storage, detect whether an accumulated value in a payment transaction corresponding to the last node of the current payment transaction linked list is the same as an accumulated value in a payment write-off transaction corresponding to the last node of the current payment write-off linked list; and if yes, publish the payment transaction to the blockchain for certificate storage.

Optionally, the accumulated value in the payment transaction includes the total amount of accumulated payments and the total number of accumulated payments; and the accumulated value in the payment write-off transaction includes the total amount of accumulated write-offs and the total number of accumulated write-offs.

Optionally, the payment transaction further includes a hash index pointing to a previous payment transaction whose certificate has been stored on the blockchain; and the payment write-off result transaction further includes a hash index pointing to a previous payment write-off transaction whose certificate has been stored on the blockchain, and a hash index pointing to the payment transaction corresponding to the payment write-off transaction.

Optionally, the payment information includes a payment amount; the payment system maintains the total amount of accumulated payments and the total number of accumulated payments in the payment transaction corresponding to the last node of the payment transaction linked list; and the first construction unit 706 is configured to: obtain the payment transaction corresponding to the last node of the current payment transaction linked list, and generate a hash index of the payment transaction corresponding to the last node of the linked list; determine the total amount of accumulated payments in the payment transaction based on the total amount of accumulated payments maintained by the payment system and the payment amount included in the payment message; determine the total number of accumulated payments in the payment transaction based on the total number of accumulated payments maintained by the payment system; and construct the payment transaction based on the payment information, the generated hash index, and the total amount of accumulated payments and the total number of accumulated payments in the payment transaction.

Optionally, the apparatus further includes the following: an update unit 708, configured to: after the payment transaction is published to the blockchain for certificate storage, update the total amount of accumulated payments and the total number of accumulated payments maintained by the payment system, by using the total amount of accumulated payments and the total number of accumulated payments recorded in the payment transaction, respectively.

Optionally, the apparatus further includes the following: a resetting unit 709, configured to clear the total amount of accumulated payments and the total number of accumulated payments maintained by the payment system after the fund settlement is completed.

Optionally, the apparatus further includes the following: a second construction unit 710, configured to construct a payment settlement certificate transaction based on a fund settlement result after the fund settlement is completed; and a second publishing unit 711, configured to publish the payment settlement certificate transaction to the blockchain for certificate storage.

Figure 8:
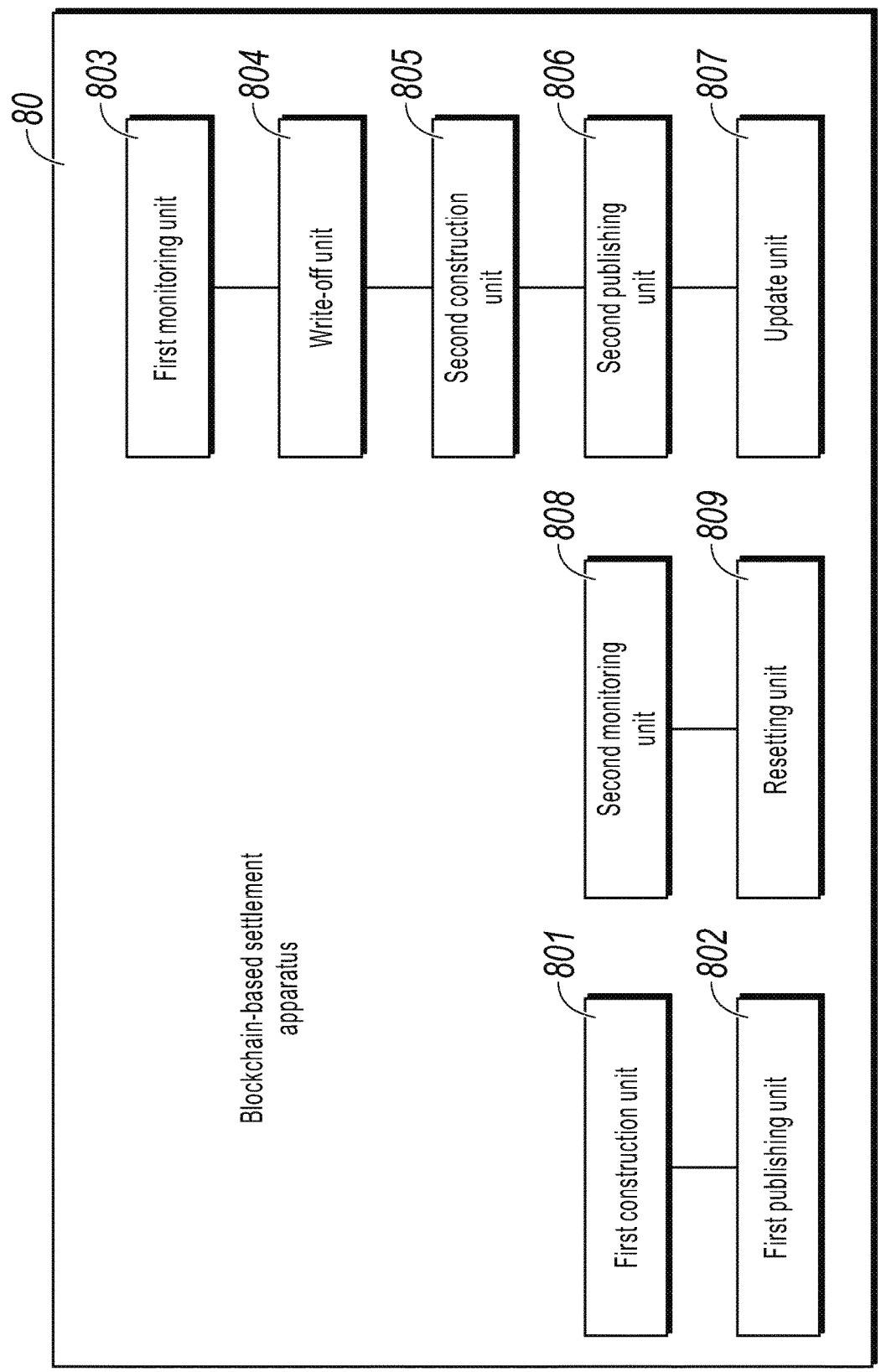
FIG. 8 is a block diagram illustrating another blockchain-based settlement apparatus, according to an example implementation of the present specification.

FIG. 8 is a block diagram illustrating another blockchain-based settlement apparatus, according to an example implementation of the present specification. The apparatus can be applied to a payee system connected to the blockchain, and can include the following units: a first construction unit 801, configured to: in response to a payment settlement request initiated by a client device, construct a settlement request transaction based on the settlement request; and a first publishing unit 802, configured to publish the payment settlement request transaction to the blockchain for certificate storage, so that a payment system monitors the payment settlement request transaction of the payee system whose certificate has been stored on the blockchain; in response to the detected payment settlement request transaction, obtains a target payment transaction corresponding to the last node of a payment transaction linked list comprising payment transactions whose certificates have been stored on the blockchain in a payment order, obtains a target payment write-off transaction corresponding to the last node of a payment write-off transaction linked list comprising payment write-off transactions whose certificates have been stored on the blockchain in a payment write-off order; determines whether an accumulated value in the target payment transaction is the same as an accumulated value in the target payment write-off transaction; and if yes, performs fund settlement based on the accumulated value in the target payment transaction or the target payment write-off transaction, where the payment transaction includes an accumulated value corresponding to accumulation of unsettled transactions up to the payment transaction in the payment transaction linked list, and the payment write-off transaction includes an accumulated value corresponding to accumulation of unsettled transactions up to the payment write-off transaction in the payment write-off transaction linked list.

Optionally, the apparatus further includes the following: a first monitoring unit 803, configured to monitor the payment transaction of the payment system whose certificate has been stored on the blockchain, where the payment transaction includes payment information; a write-off unit 804, configured to perform payment write-off based on the payment information in the payment transaction in response to the detected payment transaction; a second construction unit 805, configured to construct the payment write-off transaction based on a payment write-off result; and a second publishing unit 806, configured to publish the payment write-off transaction to the blockchain for certificate storage.

Optionally, the accumulated value in the payment transaction includes the total amount of accumulated payments and the total number of accumulated payments; and the accumulated value in the payment write-off transaction includes the total amount of accumulated write-offs and the total number of accumulated write-offs.

Optionally, the payment transaction further includes a hash index pointing to a previous payment transaction whose certificate has been stored on the blockchain; and the payment write-off result transaction further includes a hash index pointing to a previous payment write-off transaction whose certificate has been stored on the blockchain, and a hash index pointing to the payment transaction corresponding to the payment write-off transaction.

Optionally, the payment information includes a payment amount; the payee system maintains the total amount of accumulated write-offs and the total number of accumulated write-offs in the payment write-off transaction corresponding to the last node of the payment write-off transaction linked list; and the second construction unit 805 is configured to: obtain the payment write-off transaction corresponding to the last node of the current payment write-off transaction linked list, and generate a hash index of the payment write-off transaction corresponding to the last node of the linked list; generate a hash index of the detected payment transaction; determine the total amount of accumulated write-offs in the payment write-off transaction based on the total amount of accumulated write-offs maintained by the payee system and the payment amount included in the payment transaction; determine the total number of accumulated write-offs in the payment write-off transaction based on the total number of accumulated write-offs maintained by the payee system; and construct the payment write-off transaction based on the payment write-off result, the hash index of the payment write-off transaction corresponding to the last node of the linked list, the hash index of the payment transaction, the total amount of accumulated write-offs, and the total number of accumulated write-offs in the payment write-off transaction.

Optionally, the second publishing unit 806 is configured to: detect whether the sum of the total amount of accumulated write-offs maintained by the payee system and the payment amount is the same as the total amount of accumulated payments in the payment transaction, and detect whether the number of accumulated write-offs maintained by the payee system plus one is the same as the total number of accumulated payments in the payment transaction; and if both are yes, publish the payment write-off transaction to the blockchain for certificate storage.

Optionally, the apparatus further includes the following: an update unit 807, configured to: after the payment write-off transaction is published to the blockchain for certificate storage, update the total amount of accumulated write-offs and the total number of accumulated write-offs maintained by the payee system based on the total amount of accumulated write-offs and the total number of accumulated write-offs in the payment write-off transaction.

Optionally, the apparatus further includes the following: a second monitoring unit 808, configured to monitor a payment settlement certificate transaction that is published to the blockchain by the payment system; and a resetting unit 809, configured to clear the total amount of accumulated write-offs and the total number of accumulated write-offs maintained by the payee system in response to the payment settlement certificate transaction.

Corresponding to the previous method implementation, the present specification further provides an implementation of an electronic device. The electronic device includes the following: a processor; and a memory, configured to store a machine executable instruction, where the processor and the memory are usually interconnected by using an internal bus. In other possible implementations, the device can further include an external interface to communicate with other devices or components.

In the present implementation, by reading and executing a machine executable instruction that is stored in the memory and corresponds to control logic of blockchain-based settlement, the processor is enabled to perform the following operations: monitoring a settlement request transaction of a payee system whose certificate has been stored on the blockchain; in response to the detected payment settlement request transaction, obtaining a target payment transaction corresponding to the last node of a payment transaction linked list comprising payment transactions whose certificates have been stored on the blockchain in a payment order, obtaining a target payment write-off transaction corresponding to the last node of a payment write-off transaction linked list comprising payment write-off transactions whose certificates have been stored on the blockchain in a payment write-off order, where the payment transaction includes an accumulated value corresponding to accumulation of unsettled transactions up to the payment transaction in the payment transaction linked list, and the payment write-off transaction includes an accumulated value corresponding to accumulation of unsettled transactions up to the payment write-off transaction in the payment write-off transaction linked list; determining whether an accumulated value in the target payment transaction is the same as an accumulated value in the target payment write-off transaction; and if yes, performing fund settlement based on the accumulated value in the target payment transaction or the target payment write-off transaction.

Optionally, by reading and executing a machine executable instruction that is stored in the memory and corresponds to control logic of blockchain-based settlement, the processor is enabled to perform the following operations: obtaining a payment message sent by a user terminal, where the payment message includes payment information; constructing a payment transaction based on the payment information in response to the payment message; and publishing the payment transaction to the blockchain for certificate storage, so that the payee system performs payment write-off based on the payment information in the payment transaction after detecting the payment transaction whose certificate has been stored on the blockchain, and publishes a payment write-off transaction constructed by using a payment write-off result to the blockchain for certificate storage.

Optionally, by reading and executing a machine executable instruction that is stored in the memory and corresponds to control logic of blockchain-based settlement, the processor is enabled to perform the following operations: detecting whether an accumulated value in a payment transaction corresponding to the last node of the current payment transaction linked list is the same as an accumulated value in a payment write-off transaction corresponding to the last node of the current payment write-off linked list; and if yes, publishing the payment transaction to the blockchain for certificate storage.

Optionally, by reading and executing a machine executable instruction that is stored in the memory and corresponds to control logic of blockchain-based settlement, the processor is enabled to implement the following: the accumulated value in the payment transaction includes the total amount of accumulated payments and the total number of accumulated payments; and the accumulated value in the payment write-off transaction includes the total amount of accumulated write-offs and the total number of accumulated write-offs.

Optionally, by reading and executing a machine executable instruction that is stored in the memory and corresponds to control logic of blockchain-based settlement, the processor is enabled to implement the following: the payment transaction further includes a hash index pointing to a previous payment transaction whose certificate has been stored on the blockchain; and the payment write-off result transaction further includes a hash index pointing to a previous payment write-off transaction whose certificate has been stored on the blockchain, and a hash index pointing to the payment transaction corresponding to the payment write-off transaction.

Optionally, the payment information includes a payment amount; the payment system maintains the total amount of accumulated payments and the total number of accumulated payments in the payment transaction corresponding to the last node of the payment transaction linked list; and by reading and executing a machine executable instruction that is stored in the memory and corresponds to control logic of blockchain-based settlement, the processor is enabled to perform the following operations: obtaining the payment transaction corresponding to the last node of the current payment transaction linked list, and generating a hash index of the payment transaction corresponding to the last node of the linked list; determining the total amount of accumulated payments in the payment transaction based on the total amount of accumulated payments maintained by the payment system and the payment amount included in the payment message; determining the total number of accumulated payments in the payment transaction based on the total number of accumulated payments maintained by the payment system; and constructing the payment transaction based on the payment information, the generated hash index, and the total amount of accumulated payments and the total number of accumulated payments in the payment transaction.

Optionally, by reading and executing a machine executable instruction that is stored in the memory and corresponds to control logic of blockchain-based settlement, the processor is enabled to perform the following operation: after the payment transaction is published to the blockchain for certificate storage, updating the total amount of accumulated payments and the total number of accumulated payments maintained by the payment system, by using the total amount of accumulated payments and the total number of accumulated payments recorded in the payment transaction, respectively.

Optionally, by reading and executing a machine executable instruction that is stored in the memory and corresponds to control logic of blockchain-based settlement, the processor is further enabled to perform the following operation: clearing the total amount of accumulated payments and the total number of accumulated payments maintained by the payment system after the fund settlement is completed.

Optionally, by reading and executing a machine executable instruction that is stored in the memory and corresponds to control logic of blockchain-based settlement, the processor is further enabled to perform the following operations: constructing a payment settlement certificate transaction based on a fund settlement result after the fund settlement is completed; and publishing the payment settlement certificate transaction to the blockchain for certificate storage.

Corresponding to the previous method implementation, the present specification further provides an implementation of another electronic device. The electronic device includes the following: a processor; and a memory, configured to store a machine executable instruction, where the processor and the memory are usually interconnected by using an internal bus. In other possible implementations, the device can further include an external interface to communicate with other devices or components.

In the present implementation, by reading and executing a machine executable instruction that is stored in the memory and corresponds to control logic of blockchain-based settlement, the processor is enabled to perform the following operations: in response to a payment settlement request initiated by a client device, constructing a settlement request transaction based on the settlement request; and publishing the payment settlement request transaction to the blockchain for certificate storage, so that a payment system monitors the payment settlement request transaction of the payee system whose certificate has been stored on the blockchain; in response to the detected payment settlement request transaction, obtains a target payment transaction corresponding to the last node of a payment transaction linked list comprising payment transactions whose certificates have been stored on the blockchain in a payment order, obtains a target payment write-off transaction corresponding to the last node of a payment write-off transaction linked list comprising payment write-off transactions whose certificates have been stored on the blockchain in a payment write-off order; determines whether an accumulated value in the target payment transaction is the same as an accumulated value in the target payment write-off transaction; and if yes, performs fund settlement based on the accumulated value in the target payment transaction or the target payment write-off transaction, where the payment transaction includes an accumulated value corresponding to accumulation of unsettled transactions up to the payment transaction in the payment transaction linked list, and the payment write-off transaction includes an accumulated value corresponding to accumulation of unsettled transactions up to the payment write-off transaction in the payment write-off transaction linked list.

Optionally, by reading and executing a machine executable instruction that is stored in the memory and corresponds to control logic of blockchain-based settlement, the processor is enabled to perform the following operations: monitoring the payment transaction of the payment system whose certificate has been stored on the blockchain, where the payment transaction includes payment information; performing payment write-off based on the payment information in the payment transaction in response to the detected payment transaction; and constructing the payment write-off transaction based on a payment write-off result, and publishing the payment write-off transaction to the blockchain for certificate storage.

Optionally, by reading and executing a machine executable instruction that is stored in the memory and corresponds to control logic of blockchain-based settlement, the processor is enabled to implement the following: the accumulated value in the payment transaction includes the total amount of accumulated payments and the total number of accumulated payments; and the accumulated value in the payment write-off transaction includes the total amount of accumulated write-offs and the total number of accumulated write-offs.

Optionally, by reading and executing a machine executable instruction that is stored in the memory and corresponds to control logic of blockchain-based settlement, the processor is enabled to implement the following: the payment transaction further includes a hash index pointing to a previous payment transaction whose certificate has been stored on the blockchain; and the payment write-off result transaction further includes a hash index pointing to a previous payment write-off transaction whose certificate has been stored on the blockchain, and a hash index pointing to the payment transaction corresponding to the payment write-off transaction.

Optionally, the payment information includes a payment amount; the payee system maintains the total amount of accumulated write-offs and the total number of accumulated write-offs in the payment write-off transaction corresponding to the last node of the payment write-off transaction linked list; and by reading and executing a machine executable instruction that is stored in the memory and corresponds to control logic of blockchain-based settlement, the processor is enabled to perform the following operations: obtaining the payment write-off transaction corresponding to the last node of the current payment write-off transaction linked list, and generating a hash index of the payment write-off transaction corresponding to the last node of the linked list; generating a hash index of the detected payment transaction; determining the total amount of accumulated write-offs in the payment write-off transaction based on the total amount of accumulated write-offs maintained by the payee system and the payment amount included in the payment transaction; determining the total number of accumulated write-offs in the payment write-off transaction based on the total number of accumulated write-offs maintained by the payee system; and constructing the payment write-off transaction based on the payment write-off result, the hash index of the payment write-off transaction corresponding to the last node of the linked list, the hash index of the payment transaction, the total amount of accumulated write-offs, and the total number of accumulated write-offs in the payment write-off transaction.

Optionally, by reading and executing a machine executable instruction that is stored in the memory and corresponds to control logic of blockchain-based settlement, the processor is enabled to perform the following operations: detecting whether the sum of the total amount of accumulated write-offs maintained by the payee system and the payment amount is the same as the total amount of accumulated payments in the payment transaction, and detecting whether the number of accumulated write-offs maintained by the payee system plus one is the same as the total number of accumulated payments in the payment transaction; and if both are yes, publishing the payment write-off transaction to the blockchain for certificate storage.

Optionally, by reading and executing a machine executable instruction that is stored in the memory and corresponds to control logic of blockchain-based settlement, the processor is enabled to perform the following operation: updating the total amount of accumulated write-offs and the total number of accumulated write-offs maintained by the payee system based on the total amount of accumulated write-offs and the total number of accumulated write-offs in the payment write-off transaction.

Optionally, by reading and executing a machine executable instruction that is stored in the memory and corresponds to control logic of blockchain-based settlement, the processor is enabled to perform the following operations: monitoring a payment settlement certificate transaction that is published to the blockchain by the payment system; and clearing the total amount of accumulated write-offs and the total number of accumulated write-offs maintained by the payee system in response to the payment settlement certificate transaction.

For an implementation process of functions and roles of each unit in the apparatus, references can be made to an implementation process of corresponding steps in the previous method. Details are omitted here for simplicity.

Because an apparatus implementation corresponds to a method implementation, for related parts, references can be made to related descriptions in the method implementation. The previously described apparatus implementation is merely an example. The units described as separate parts can or cannot be physically separate, and parts displayed as units can or cannot be physical units, can be located in one position, or can be distributed on multiple network units. Some or all of the modules can be selected depending on an actual demand to achieve the objectives of the solutions of the present specification. A person of ordinary skill in the art can understand and implement the implementations of the present specification without creative efforts.

The previous descriptions are merely example implementations of the present specification, but are not intended to limit the present specification. Any modification, equivalent replacement, or improvement made without departing from the spirit and principle of the present specification shall fall within the protection scope of the present specification.

What is claimed is:

1. A computer-implemented method for blockchain-based settlement, comprising:

monitoring, by a payment system connected to a blockchain, a payment settlement request transaction of a payee system, wherein the blockchain maintains a payment transaction linked list and a payment write-off transaction linked list, the payment transaction linked list comprises a series of payment transactions that have been stored on the blockchain according to a payment order, and each of the series of payment transaction comprises a hash index pointing to a previous payment transaction according to the payment order in the payment transaction linked list; and the payment write-off transaction linked list comprises a series of payment write-off transactions that have been stored on the blockchain in a payment write-off order, and each of the series of payment write-off transactions comprises:

a first hash index pointing to a previous payment write-off transaction according to the payment write-off order in the payment write-off transaction linked list, and a second hash index pointing to a payment transaction corresponding to the payment write-off transaction;

in response to detecting the payment settlement request transaction:

obtaining a target payment transaction corresponding to a last node of the payment transaction linked list, wherein the target payment transaction comprises an accumulated value corresponding to accumulation of unsettled transactions up to the target payment transaction in the payment transaction linked list; and obtaining a target payment write-off transaction corresponding to a last node of the payment write-off transaction linked list, wherein the target payment write-off transaction comprises an accumulated value corresponding to accumulation of unsettled transactions up to the target payment write-off transaction in the payment write-off transaction linked list;

determining whether an accumulated value in the target payment transaction is identical to an accumulated value in the target payment write-off transaction; and in response to determining that the accumulated value in the target payment transaction is identical to the accumulated value in the target payment write-off transaction, performing fund settlement based on the accumulated value in the target payment transaction or the accumulated value in the target payment write-off transaction.

2. The computer-implemented method according to claim 1, further comprising:

obtaining a payment message sent by a user terminal, wherein the payment message comprises payment information;

constructing a payment transaction based on the payment information in response to the payment message; and publishing the payment transaction to the blockchain for certificate storage that causes the payee system to perform payment write-off based on the payment information in the payment transaction after detecting the payment transaction that has been stored on the blockchain, and to publish a payment write-off transaction based on a payment write-off result to the blockchain for certificate storage.

3. The computer-implemented method according to claim 2, wherein the publishing the payment transaction to the blockchain for certificate storage comprises:

detecting whether an accumulated value in a payment transaction corresponding to a last node of a current payment transaction linked list is identical to an accumulated value in a payment write-off transaction corresponding to a last node of a current payment write-off linked list; and in response to detecting that the accumulated value in the payment transaction corresponding to the last node of the current payment transaction linked list is identical to the accumulated value in the payment write-off transaction corresponding to the last node of the current payment write-off linked list, publishing the payment transaction to the blockchain for certificate storage.

4. The computer-implemented method according to claim 2, wherein:

the accumulated value in the target payment transaction comprises a total amount of accumulated payments and a total number of accumulated payments; and the accumulated value in the target payment write-off transaction comprises a total amount of accumulated write-offs and a total number of accumulated write-offs.

5. The computer-implemented method according to claim 4, wherein:

the total number of accumulated payments comprises a total number of nodes added in the payment transaction linked list from a time point at which a previous payment settlement request transaction was detected to a time point at which the payment settlement request transaction was detected, and the total number of accumulated write-offs comprises a total number of nodes added the payment write-off transaction linked list from the time point at which the previous payment settlement request transaction was detected to the time point at which the payment settlement request transaction was detected.

6. The computer-implemented method according to claim 5, wherein:

the payment information comprises a payment amount;

the payment system maintains a total amount of accumulated payments and a total number of accumulated payments in the payment transaction corresponding to the last node of the payment transaction linked list; and the constructing a payment transaction based on the payment information comprises:

obtaining the payment transaction corresponding to the last node of a current payment transaction linked list;

generating a hash index of the payment transaction corresponding to the last node of the payment transaction linked list;

determining the total amount of accumulated payments in the payment transaction based on the total amount of accumulated payments maintained by the payment system and the payment amount included in the payment message;

determining the total number of accumulated payments in the payment transaction based on the total number of accumulated payments maintained by the payment system; and constructing the payment transaction based on the payment information, the hash index, and the total amount of accumulated payments and the total number of accumulated payments in the payment transaction.

7. The computer-implemented method according to claim 6, wherein after the publishing the payment transaction to the blockchain for certificate storage, the computer-implemented method further comprises:

updating the total amount of accumulated payments and the total number of accumulated payments maintained by the payment system, by using the total amount of accumulated payments and the total number of accumulated payments recorded in the payment transaction, respectively.

8. The computer-implemented method according to claim 6, wherein the computer-implemented method further comprises:

clearing the total amount of accumulated payments and the total number of accumulated payments maintained by the payment system after the fund settlement is completed.

9. The computer-implemented method according to claim 1, wherein the computer-implemented method further comprises:

constructing a payment settlement certificate transaction based on a fund settlement result after the fund settlement is completed; and publishing the payment settlement certificate transaction to the blockchain for certificate storage.

10. A non-transitory, computer-readable medium storing one or more instructions executable by a computer system to perform operations comprising:

monitoring, by a payment system connected to a blockchain, a payment settlement request transaction of a payee system, wherein the blockchain maintains a payment transaction linked list and a payment write-off transaction linked list, the payment transaction linked list comprises a series of payment transactions that have been stored on the blockchain according to a payment order, and each of the series of payment transaction comprises a hash index pointing to a previous payment transaction according to the payment order in the payment transaction linked list; and the payment write-off transaction linked list comprises a series of payment write-off transactions that have been stored on the blockchain in a payment write-off order, and each of the series of payment write-off transactions comprises:

a first hash index pointing to a previous payment write-off transaction according to the payment write-off order in the payment write-off transaction linked list, and a second hash index pointing to a payment transaction corresponding to the payment write-off transaction;

in response to detecting the payment settlement request transaction:

obtaining a target payment transaction corresponding to a last node of the payment transaction linked list, wherein the target payment transaction comprises an accumulated value corresponding to accumulation of unsettled transactions up to the target payment transaction in the payment transaction linked list; and obtaining a target payment write-off transaction corresponding to a last node of a payment write-off transaction linked list, wherein the target payment write-off transaction comprises an accumulated value corresponding to accumulation of unsettled transactions up to the target payment write-off transaction in the payment write-off transaction linked list;

determining whether an accumulated value in the target payment transaction is identical to an accumulated value in the target payment write-off transaction; and in response to determining that the accumulated value in the target payment transaction is identical to the accumulated value in the target payment write-off transaction, performing fund settlement based on the accumulated value in the target payment transaction or the accumulated value in the target payment write-off transaction.

11. The non-transitory, computer-readable medium according to claim 10, wherein the operations further comprise:
obtaining a payment message sent by a user terminal, wherein the payment message comprises payment information;
constructing a payment transaction based on the payment information in response to the payment message; and
publishing the payment transaction to the blockchain for certificate storage that causes the payee system to perform payment write-off based on the payment information in the payment transaction after detecting the payment transaction that has been stored on the blockchain, and to publish a payment write-off transaction based on a payment write-off result to the blockchain for certificate storage.

12. The non-transitory, computer-readable medium according to claim 11, wherein the publishing the payment transaction to the blockchain for certificate storage comprises:
detecting whether an accumulated value in a payment transaction corresponding to a last node of a current payment transaction linked list is identical to an accumulated value in a payment write-off transaction corresponding to a last node of a current payment write-off linked list; and
in response to detecting that the accumulated value in the payment transaction corresponding to the last node of the current payment transaction linked list is identical to the accumulated value in the payment write-off transaction corresponding to the last node of the current payment write-off linked list, publishing the payment transaction to the blockchain for certificate storage.

13. The non-transitory, computer-readable medium according to claim 11, wherein:
the accumulated value in the target payment transaction comprises a total amount of accumulated payments and a total number of accumulated payments; and
the accumulated value in the target payment write-off transaction comprises a total amount of accumulated write-offs and a total number of accumulated write-offs.

14. The non-transitory, computer-readable medium according to claim 13, wherein:
the total number of accumulated payments comprises a total number of nodes added in the payment transaction linked list from a time point at which a previous payment settlement request transaction was detected to a time point at which the payment settlement request transaction was detected, and
the total number of accumulated write-offs comprises a total number of nodes added the payment write-off transaction linked list from the time point at which the previous payment settlement request transaction was detected to the time point at which the payment settlement request transaction was detected.

15. The non-transitory, computer-readable medium according to claim 14, wherein:
the payment information comprises a payment amount;
the payment system maintains a total amount of accumulated payments and a total number of accumulated payments in the payment transaction corresponding to the last node of the payment transaction linked list; and
the constructing a payment transaction based on the payment information comprises:
obtaining the payment transaction corresponding to the last node of a current payment transaction linked list;
generating a hash index of the payment transaction corresponding to the last node of the payment transaction linked list;
determining the total amount of accumulated payments in the payment transaction based on the total amount of accumulated payments maintained by the payment system and the payment amount included in the payment message;
determining the total number of accumulated payments in the payment transaction based on the total number of accumulated payments maintained by the payment system; and
constructing the payment transaction based on the payment information, the hash index, and the total amount of accumulated payments and the total number of accumulated payments in the payment transaction.

16. The non-transitory, computer-readable medium according to claim 10, wherein the operations further comprise:
constructing a payment settlement certificate transaction based on a fund settlement result after the fund settlement is completed; and
publishing the payment settlement certificate transaction to the blockchain for certificate storage.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
monitoring, by a payment system connected to a blockchain, a payment settlement request transaction of a payee system, wherein the blockchain maintains a payment transaction linked list and a payment write-off transaction linked list,
the payment transaction linked list comprises a series of payment transactions that have been stored on the blockchain according to a payment order, and each of the series of payment transaction comprises a hash index pointing to a previous payment transaction according to the payment order in the payment transaction linked list; and
the payment write-off transaction linked list comprises a series of payment write-off transactions that have been stored on the blockchain in a payment write-off order, and each of the series of payment write-off transactions comprises:
a first hash index pointing to a previous payment write-off transaction according to the payment write-off order in the payment write-off transaction linked list, and
a second hash index pointing to a payment transaction corresponding to the payment write-off transaction;
in response to detecting the payment settlement request transaction:
obtaining a target payment transaction corresponding to a last node of the payment transaction linked list, wherein the target payment transaction comprises an accumulated value corresponding to accumulation of unsettled transactions up to the target payment transaction in the payment transaction linked list; and
obtaining a target payment write-off transaction corresponding to a last node of the payment write-off transaction linked list, wherein the target payment write-off transaction comprises an accumulated value corresponding to accumulation of unsettled transactions up to the target payment write-off transaction in the payment write-off transaction linked list;

determining whether an accumulated value in the target payment transaction is identical to an accumulated value in the target payment write-off transaction; and in response to determining that the accumulated value in the target payment transaction is identical to the accumulated value in the target payment write-off transaction, performing fund settlement based on the accumulated value in the target payment transaction or the accumulated value in the target payment write-off transaction.

18. The computer-implemented system according to claim 17, wherein the operations further comprise:

obtaining a payment message sent by a user terminal, wherein the payment message comprises payment information;

constructing a payment transaction based on the payment information in response to the payment message; and publishing the payment transaction to the blockchain for certificate storage that causes the payee system to perform payment write-off based on the payment information in the payment transaction after detecting the payment transaction whose certificate has been stored on the blockchain, and to publish a payment write-off transaction based on a payment write-off result to the blockchain for certificate storage.

19. The computer-implemented system according to claim 18, wherein the publishing the payment transaction to the blockchain for certificate storage comprises:

detecting whether an accumulated value in a payment transaction corresponding to a last node of a current payment transaction linked list is identical to an accumulated value in a payment write-off transaction corresponding to a last node of a current payment write-off linked list; and in response to detecting that the accumulated value in the payment transaction corresponding to the last node of the current payment transaction linked list is identical to the accumulated value in the payment write-off transaction corresponding to the last node of the current payment write-off linked list, publishing the payment transaction to the blockchain for certificate storage.

20. The computer-implemented system according to claim 17, wherein:

the accumulated value in the target payment transaction comprises a total amount of accumulated payments and a total number of accumulated payments, the total number of accumulated payments comprises a total number of nodes added in the payment transaction linked list from a time point at which a previous payment settlement request transaction was detected to a time point at which the payment settlement request transaction was detected, the accumulated value in the target payment write-off transaction comprises a total amount of accumulated write-offs and a total number of accumulated write-offs, and the total number of accumulated write-offs comprises a total number of nodes added the payment write-off transaction linked list from the time point at which the previous payment settlement request transaction was detected to the time point at which the payment settlement request transaction was detected.

\* \* \* \* \*